US007353883B2

(12) United States Patent
Thompson

(10) Patent No.: US 7,353,883 B2
(45) Date of Patent: Apr. 8, 2008

(54) AUTOMOTIVE FIRE SUPPRESSION SYSTEM WITH QUICK CONNECT FIRE SUPPRESSION AGENT DISTRIBUTION SYSTEM

(75) Inventor: Robert Thompson, Redford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/425,512

(22) Filed: Jun. 21, 2006

(65) Prior Publication Data

US 2006/0225897 A1 Oct. 12, 2006

Related U.S. Application Data

(63) Continuation-in-part of application No. 10/907,134, filed on Mar. 22, 2005, now Pat. No. 7,198,111.

(51) Int. Cl.

*A62C 3/07* (2006.01)
*A62C 35/00* (2006.01)
*A62C 35/58* (2006.01)
*F16L 19/00* (2006.01)
*F16L 25/00* (2006.01)
*B05B 9/04* (2006.01)

(52) U.S. Cl. ............................. 169/62; 169/9; 169/16; 169/85; 285/354; 285/386; 239/373

(58) Field of Classification Search .................. 169/62, 169/9, 16, 85, 54, 56, 60, 61, 71, 84; 239/373, 239/456, 203–205, 172, 337, 452; 285/354, 285/386

See application file for complete search history.

(56) References Cited

U.S. PATENT DOCUMENTS

| | | | | |
|---|---|---|---|---|
| 4,811,796 | A * | 3/1989 | Allen | 169/62 |
| 4,984,637 | A * | 1/1991 | Finnigan | 169/61 |
| 5,992,528 | A * | 11/1999 | Parkinson et al. | 169/6 |
| 6,164,383 | A * | 12/2000 | Thomas | 169/61 |
| 6,371,213 | B1 * | 4/2002 | Smith et al. | 169/73 |
| 6,702,033 | B1 * | 3/2004 | Mitchell et al. | 169/85 |
| 2003/0150625 | A1 * | 8/2003 | Smith et al. | 169/56 |
| 2004/0226726 | A1 | 11/2004 | Holland et al. | |

* cited by examiner

*Primary Examiner*—Darren Gorman
(74) *Attorney, Agent, or Firm*—Frank MacKenzie; Dickinson Wright PLLC

(57) ABSTRACT

An onboard fire suppression system for an automotive vehicle includes at least one reservoir containing a fire suppressant agent and a propellant, operatively associated with the reservoir, for expelling the fire suppressant agent from the reservoir. A distribution system for receiving fire suppressant agent expelled from said reservoir includes at least one feeder conduit which is connected with the reservoir by means of a quick connect coupler. The quick connect coupler facilitates assembly and servicing of the fire suppression system.

7 Claims, 20 Drawing Sheets

AUTOMOTIVE FIRE SUPPRESSION SYSTEM WITH QUICK CONNECT FIRE SUPPRESSION AGENT DISTRIBUTION SYSTEM

CROSS REFERENCE TO RELATED APPLICATION(S)

This application is a continuation-in-part of U.S. patent application Ser. No. 10/907,134, filed Mar. 22, 2005 now U.S. Pat. No. 7,198,111.

BACKGROUND OF THE INVENTION

1. Field of the Invention

The present invention relates to an onboard apparatus for suppressing a fire involving an automotive vehicle.

2. Disclosure Information

Police vehicles are subject to increased exposure to collisions, particularly high-speed rear-end collisions, arising from the need for police officers to stop on the shoulders, or even in the traffic lanes, of busy highways. Unfortunately, other motorists are known to collide with police vehicles employed in this manner. These accidents can compromise the fuel system on any vehicle and may cause fires. The present system is designed to suppress the spread of, or potentially, to extinguish such a fire. U.S. Pat. No. 5,590,718, discloses an anti-fire system for vehicles in which a number of fixed nozzles are furnished with a fire extinguishing agent in response to an impact sensor. The system of the '718 patent suffers from a problem in that the release of the extinguishing agent is triggered immediately upon receipt of a significant impact. As a result, the anti-fire agent may be expended before the vehicle comes to a halt, with the further result being that a subsequent fire might not be treated by the system. Also, the '718 patent uses a valving system which could become clogged and therefore inoperable. U.S. Pat. No. 5,918,681 discloses a system which is similar to that disclosed in the '718 patent, inasmuch as the fire extinguishing system does not take into account movement of the vehicle following subjection of the vehicle to an impact. Finally, U.S. Pat. No. 5,762,145 discloses a fuel tank fire protection device including a powdered extinguishing agent panel attached to the fuel tank. In general, powder delivery systems are designed to prevent ignition of fires and are deployed upon impact. As a result, the powder may not be able to follow the post-impact movement of the struck vehicle and may not be able to prevent the delayed ignition or re-ignition of a fire.

The present fire suppression system provides significant advantages, as compared with prior art vehicular fire suppression systems.

SUMMARY OF THE INVENTION

An automotive vehicle according to the present invention includes a vehicle body and at least one reservoir containing a fire suppressant agent. The reservoir containing a fire suppression agent is mounted in proximity to the body, preferably within the body or on an external surface of the body. A sensor system determines whether the vehicle has been subjected to an impact and also whether the vehicle is moving subsequent to such an impact. A distribution system receives the fire suppressant agent from the reservoir and conducts the fire suppressant agent to at least one location about the body, either internally or externally thereto. Finally, a controller operatively connected with the sensor system and the reservoir causes the reservoir to initiate delivery of the fire suppressant agent from the reservoir through the distribution system in the event that a significant impact having a suitable magnitude, duration, and other characteristics, is sensed.

According to another aspect of the present invention, the fire suppressant reservoir includes a tank for the suppressant agent and a propellant for establishing pressure within the tank sufficient to deliver suppressant agent from the tank to the distribution system. The propellant may take the form of either a pyrotechnic gas generator, or a canister containing compressed gas, or yet other types of propellants known to those skilled in the art and suggested by this disclosure.

According to another aspect of the present invention, the distribution system for the fire suppressant agent includes a number of conduits connected with the reservoir, with the conduits feeding a number of nozzles which may include both fixed and variable geometry nozzles. Release of the fire suppressant agent is governed by the controller, which is operatively connected with at least one accelerometer for sensing vehicle impact and at least one speed sensor for sensing vehicle speed.

In addition to the automatic deployment of the fire suppression system provided by the controller, a manually activatable switch is provided for causing the reservoir to initiate delivery of the fire suppressant agent from the reservoir to the distribution system. The manually activatable switch includes a manual pushbutton mounted upon a platform which is responsive not only to manual displacement of the pushbutton, but also to manual displacement of the platform itself.

According to another aspect of the present invention, a method for operating a fire suppression system installed in an automotive vehicle includes the steps of sensing an impact upon the vehicle, sensing the vehicle's speed following the impact, and discharging a fire suppression agent from an onboard reservoir in the event that the vehicle speed crosses a predetermined speed threshold following the sensing of an impact. As a variation of this method, a further step involves discharging the fire suppression agent only if the previous conditions are satisfied, as well as the additional condition that the vehicle is not experiencing acceleration in excess of a predetermined acceleration threshold.

The fire suppression agent will be discharged after a predetermined period of time following a significant, or triggering, impact upon the vehicle, regardless of subsequent vehicle speed or acceleration. In this manner, the fire suppression agent will be discharged in the event that the vehicle does not move following an impact. This also permits the system to discharge the suppression agent even if the system's sensors are damaged during an impact.

The sensor system used with the present fire suppression system may be combined with a control system for an occupant restraint airbag or other occupant restraints.

According to another aspect of the present invention, a quick connect coupler attaches the fire suppressant feeder conduit to the suppressant agent reservoir. By eliminating the need for the numerous fasteners which would otherwise be required to attach a conventional flange to the reservoir, assembly and in-use servicing of the present fire suppression system are facilitated. In effect, assembly cost is reduced, while helping to assure the operational integrity of the fire suppression system.

According to another aspect of the present invention, the nozzles employed to distribute fire suppression agent discharged from the reservoir may be made from porous material, such as ceramic, or sintered metal. The nozzle may incorporate a closure bulkhead at a first end, and an integral stop abutment at a second end. As compared with a stamped or billet nozzle, a porous metal nozzle produces a more uniform distribution of suppressant agent, and at a lower cost than some competing technologies.

According to another aspect of the present invention, a fire suppressant reservoir may be formed as a composite characterized by an outer wall combined with a sealing liner. This construction is generally lighter in weight than conventional all-metal pressure vessels, and offers the advantage of enhanced corrosion resistance. The sealing liner, which may be formed from plastics or metals, or yet other materials, functions to seal leaks by extruding into sealing engagement with the outer wall in the event that a pressure-formed discontinuity opens in the outer wall. The outer wall may be formed from metal or fiber reinforced resin, or other materials known to those skilled in the art and suggested by this disclosure.

According to another aspect of the present invention, the gaseous propellant which expels the suppressant from the reservoir may either be the product of a pyrotechnic device, or a gas released from a charged cylinder. This cylinder may be either internal or external to the fire suppressant reservoir. If the gas cylinder is mounted externally, it offers the advantage of permitting a greater volume of fire suppressant to be carried within the reservoir. Alternatively, a smaller reservoir having the same interior volume could be employed with an external gas cylinder in the event that package space is a problem.

According to yet another aspect of the present invention, the fire suppressant agent used with this system may be either a single component, such as an aqueous-based preparation, or a binary system in which the primary component is carried within a reservoir, and a secondary component, such as potassium carbonate, carried within the system's feeder conduits. In this manner, the flow of the primary component through the feeder conduits will cause the discharge of the secondary component into the flowing liquid. Then, both components will mix and be discharged simultaneously. This arrangement permits the use of a binary fire suppression agent without the need for additional storage tanks and propellant devices.

According to another aspect of the present invention, in the event that a composite reservoir is specified, it will not generally be possible to weld the initiator conductor conduit, which extends from an upper portion of the system reservoir to a lower portion of the reservoir, to the reservoir itself. In such case, an inventive conductor conduit having an axially compliant section and integral upper and lower bonding flanges will allow the conduit to be installed and sealed after the reservoir's pressure vessel shell has been fabricated. This axially compliant conduit permits the initiator conductor to be protected in substantially the same manner as with a welded steel reservoir, but without the need for welding.

According to another aspect of the present invention, a composite reservoir for containing fire suppression agent has a lower closure with a metal or composite plug having a circumferential groove and tension ring for anchoring the outer wall of the composite wall material to the plug. This construction permits a propellant to be mounted to the lower wall of the suppressant reservoir in a manner which resists tearout of the propellant base during deployment of the present system.

According to yet another aspect of the present invention, a composite reservoir has a reinforced double concave section. This configuration is necessitated by packaging considerations applicable to the vehicle underbody environment. The double concave section presents a novel design task for fiber-resin composites because the fiber reinforcement in such a section is not placed in tension by the gas force accompanying deployment of the fire suppressant agent. The reinforcements according to the present invention provide the tensile strength needed to withstand this internal gas pressure. In this manner, the volume of suppressant agent may be maximized because the double concave design feature allows the reservoir to be fitted into spaces having rather complex geometry.

The present fire suppression system represents an advantage over other known systems because it has the capability to suppress a fire without the wheel "shadowing" which would otherwise occur if the flow of fire suppression agent were blocked by one or more wheels when the vehicle is stopped.

The present fire suppression system offers the additional advantage of not only automatic actuation, but also manual actuation, so as to allow the vehicle's operator to discharge the system even when the vehicle has not suffered a significant impact.

The present system offers the additional advantage that both variable and fixed geometry nozzles are used to assure adequate dispersion of the fire suppression agent, with the integrity of the system being protected from both road splash and objects thrown up by the vehicle's wheels during normal operation of the vehicle. Because the variable geometry nozzles are normally tucked up into the vehicle underbody region well above the road surface, these nozzles are protected from damage which would otherwise result from law enforcement maneuvers such as striking curbs and driving offroad.

The present system offers the additional advantage that the system operates without the need for an optical or other type of fire sensor which could become obscured, and therefore inoperable, in a vehicle underbody environment. The absence of such sensors allows the present system to begin its activation sequence immediately upon receipt of data indicating a triggering impact.

The present system offers the additional advantage that the system operates in the event of impacts which are directed against a vehicle not only longitudinally, but also laterally.

The present fire suppression system is designed advantageously to help reduce the risk of injury in high-speed rear impacts. The fire suppression system deploys chemicals designed to suppress the spread of fire or potentially extinguish a fire, thereby providing more time for occupants to escape from a crashed vehicle.

Other advantages, as well as objects and features of the present invention will become apparent to the reader of this specification.

DETAILED DESCRIPTION OF THE PREFERRED EMBODIMENTS

Figure 1:
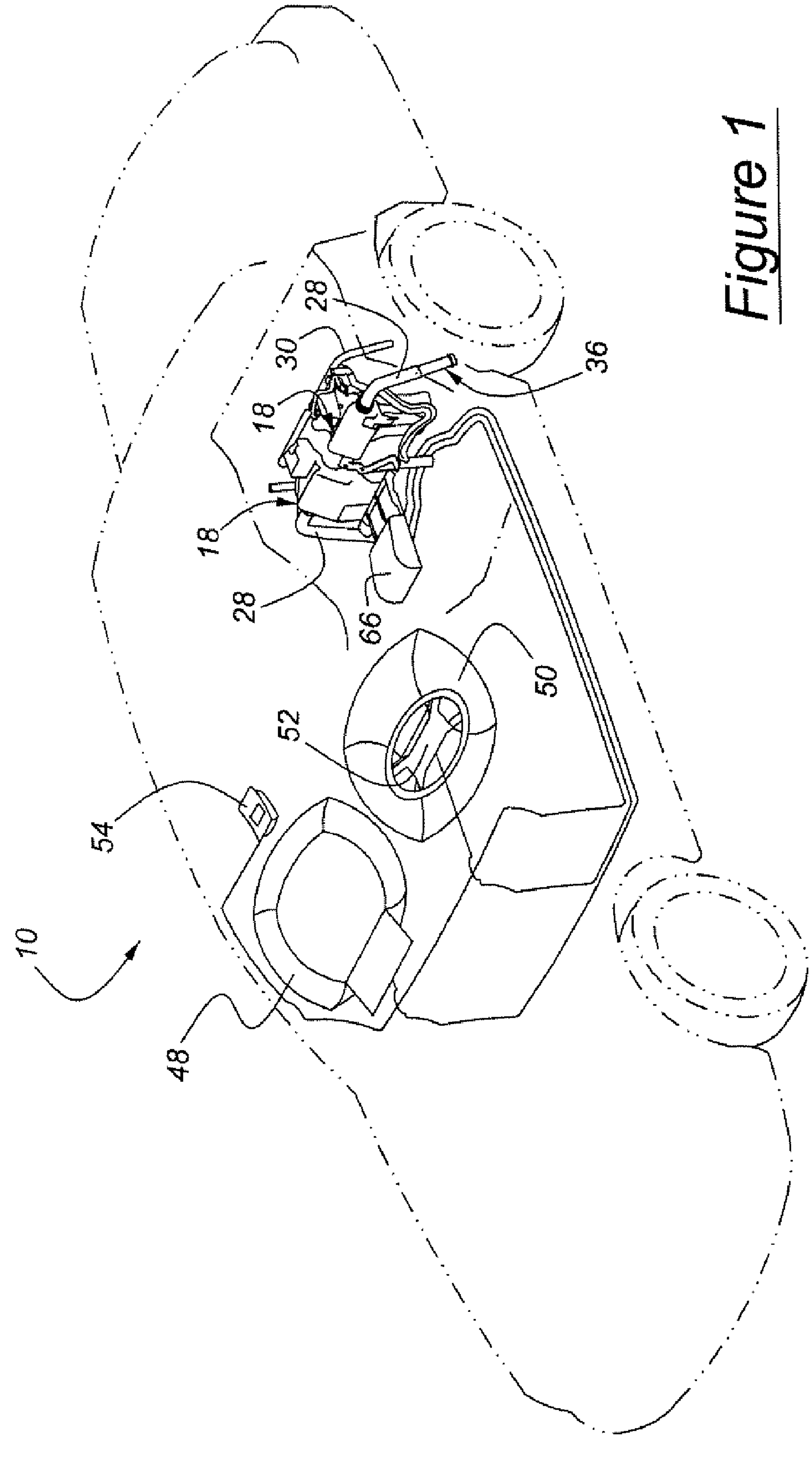
FIG. 1 is a ghost perspective view of an automotive vehicle having a fire suppression system according to the present invention.

As shown in FIG. 1, vehicle 10 has a passenger airbag restraint, 48, and a driver's airbag restraint, 50, mounted adjacent steering wheel 52. A fire suppression system includes controller 66 which is mounted upon floor pan 68 of vehicle 10, and reservoirs 18 which are mounted under floor pan 68 in the so-called kick-up area adjoining the rear axle of vehicle 10. Those skilled in the art will appreciate in view of this disclosure that additional passenger restraint devices, such as seat belt pretensioners and side airbags, may be installed in a vehicle and controlled at least in part by, or in conjunction with, controller 66.

Figure 2:
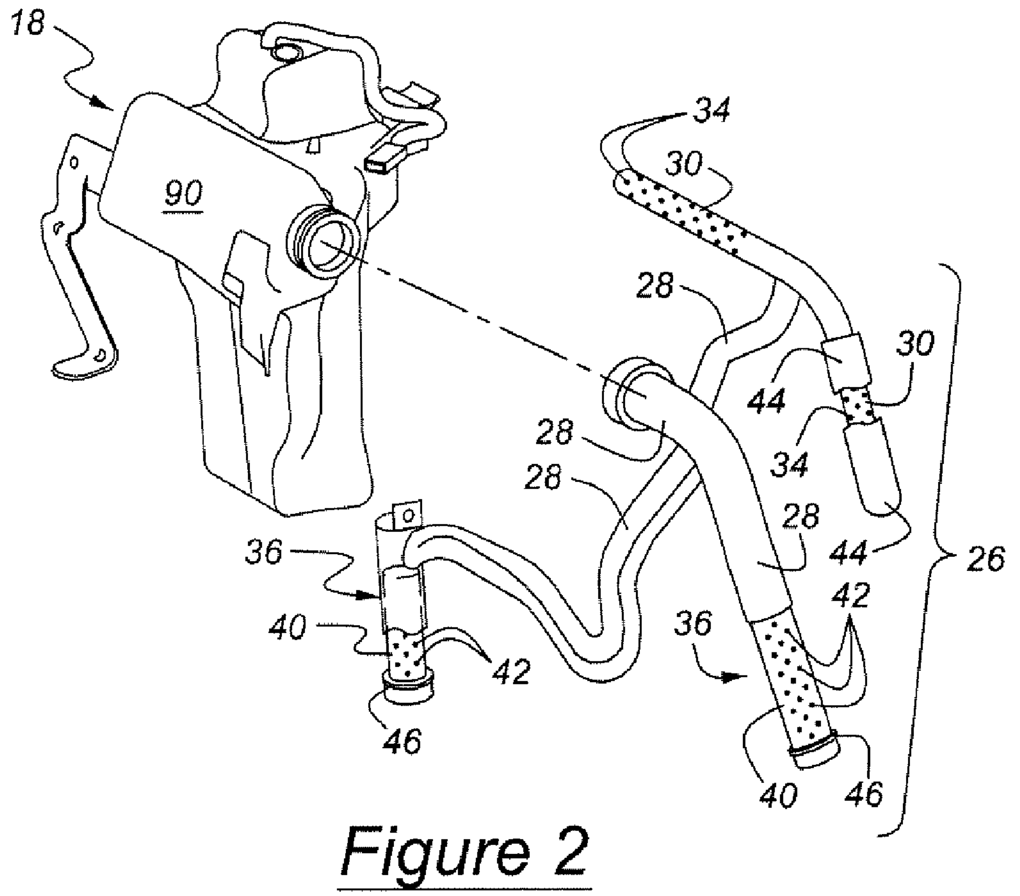
FIG. 2 is an exploded perspective view of a portion of a fire suppression system according to the present invention.
Figure 8:
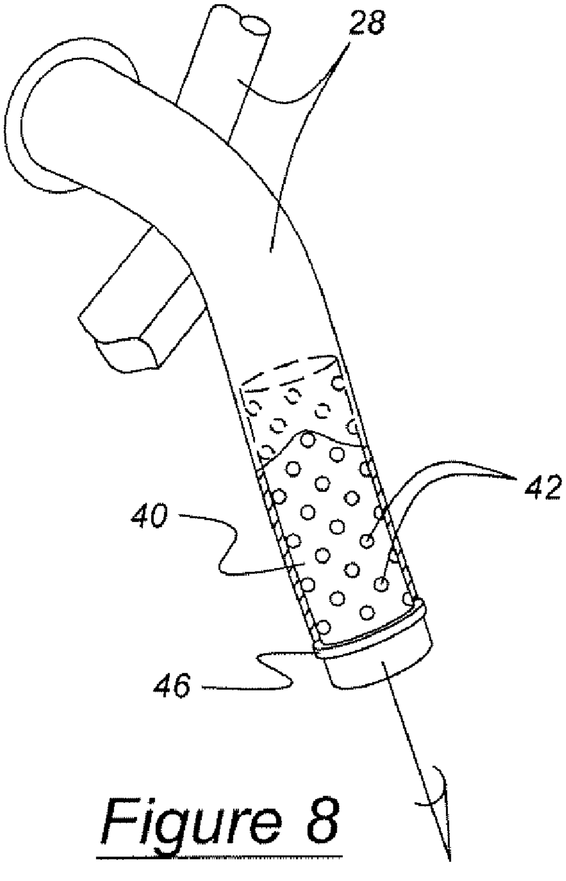
FIG. 8 is a perspective view of a variable geometry fire suppression agent nozzle according to one aspect of the present invention.

FIG. 1 shows not only reservoirs 18 but also a portion of right and left side fire suppression conduits 28, as well as fixed geometry nozzles 30 and variable geometry nozzles 36. As seen in FIG. 1, variable geometry nozzles 36 project downwardly to allow fire suppression agent to be expelled from reservoirs 18 and placed at a low angle to the ground surface the vehicle is operating upon. This mode of operation is possible because variable geometry nozzles 36 are, as shown in FIG. 2, telescopingly extensible. This telescoping feature, which is shown in greater detail in FIG. 8, is produced by a sliding spray head, 40, which is slidingly engaged with conduit 28 such that gas pressure within conduit 28 forces spray head 40 downwardly into its extended position, causing fire suppression agent 22 to be discharged through a number of holes 42 formed in spray head 40. As shown in FIG. 2, at least two variable geometry nozzles 36 may be employed with single reservoir 18, along with at least two fixed nozzles 30 which are spray bars each having a number of orifices 34. While in their normally closed state, variable geometry nozzles 36 are liquid-tight by virtue of seals 46, which are interposed between an end of each of spray heads 40 and the corresponding ends of conduits 28. In a preferred embodiment, seals 46 comprise elastomeric boots attached to an outer surface of conduit 28. Seals 46 are simply sheared by the deploying spray head 40 when the present system is discharged. Fixed nozzles 30 are also rendered liquid-tight by covers 44, which are simply blown off when the present system is discharged. The sealing of nozzles 30 and 36 is important, because this prevents the ingress of road splash, which could block the system in sub-freezing weather or cause corrosion or blockage due to mud or other foreign matter.

Figure 7:
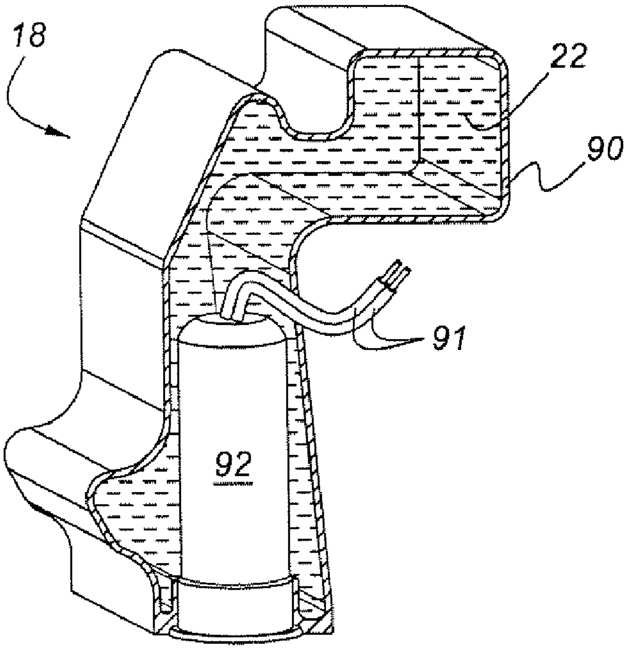
FIG. 7 is a cutaway perspective view of a fire suppression agent reservoir according to one aspect of the present invention.

Additional details of reservoir 18 are shown in FIG. 7. Tank 90 contains approximately 1.5 L of fire suppression agent 22, and a propellant 92. Propellant 92 includes two squibs (not shown) which are activated simultaneously by controller 66 via lines 91 so as to release a large amount of gas, forcing fire suppressant agent 22 from tank 90 and into distribution system 26, including conduit 28 and the various fixed and variable geometry nozzles. A preferred propellant, marketed by Primex Aerospace Company as model FS01-40, is a mixture including aminotetrazole, strontium nitrate, and magnesium carbonate. This is described in U.S. Pat. No. 6,702,033, which is hereby incorporated by reference into this specification.

Those skilled in the art will appreciate in view of this disclosure that other types of propellants could be used in the present system, such as compressed gas canisters and other types of pyrotechnic and chemical devices capable of creating a gas pressure force in a vanishingly small amount of time. Moreover, fire suppressant agent 22, which preferably includes a water-based solution with hydrocarbon surfactants, fluorosurfactants, and organic and inorganic salts sold under the trade name LVS Wet Chemical Agent® by Ansul Incorporated, could comprise other types of agents such as powders or other liquids, or yet other agents known to those skilled in the art and suggested by this disclosure. If two reservoirs 18 are employed with a vehicle, as is shown in FIG. 1, all four squibs will be deployed simultaneously.

Figure 4:
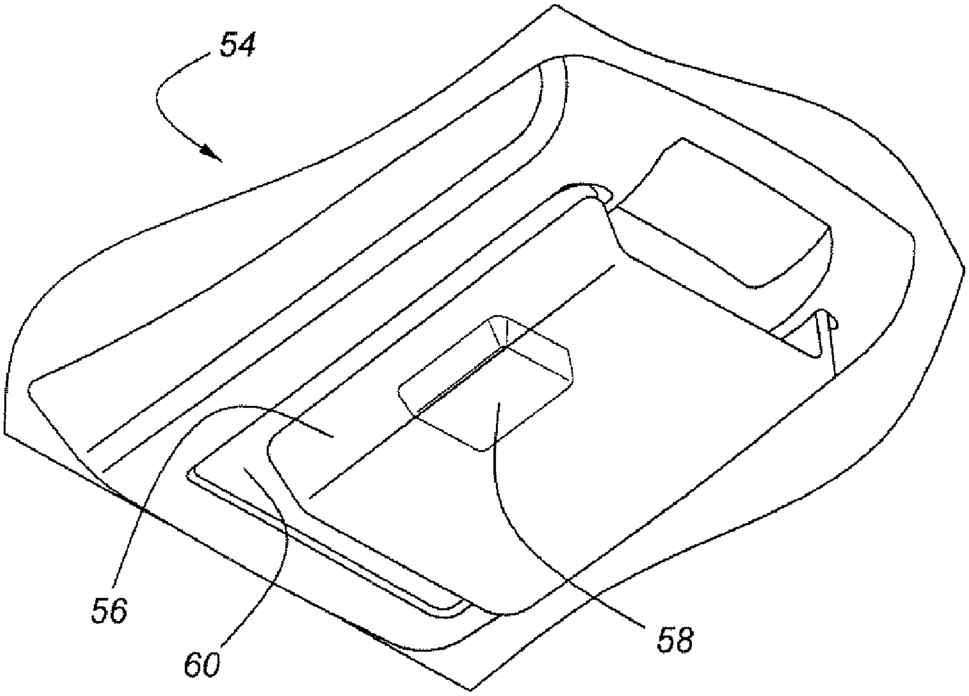
FIG. 4 is a perspective view of a manually activatable switch used with a fire suppression system according to the present invention.

FIG. 4 shows manually activatable switch 54 for use with the present system. As shown in FIG. 1, switch 54 may be advantageously located on the headliner of vehicle 10 between the sun visors, or at any other convenient position. To use this switch 54, hinged clear cover 56 is first opened by pressing on cover 56. Thereafter, the fire suppression system may be triggered by manually pressing pushbutton 58. If the vehicle occupants are not disposed to release cover 56, the system may be triggered by merely sharply depressing cover 56, thereby closing contacts (not shown) contained within platform 60.

Figure 3:
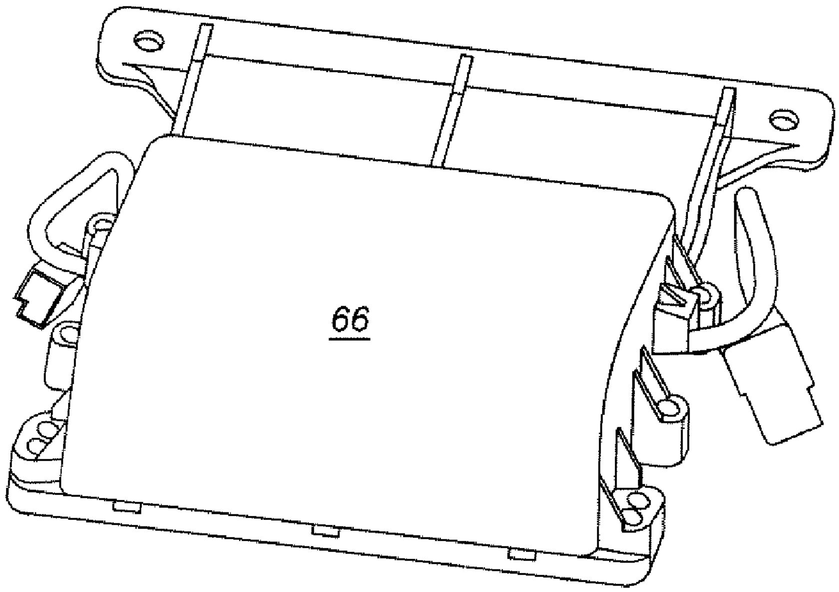
FIG. 3 is a perspective view of a control module used with a system according to the present invention.
Figure 5:
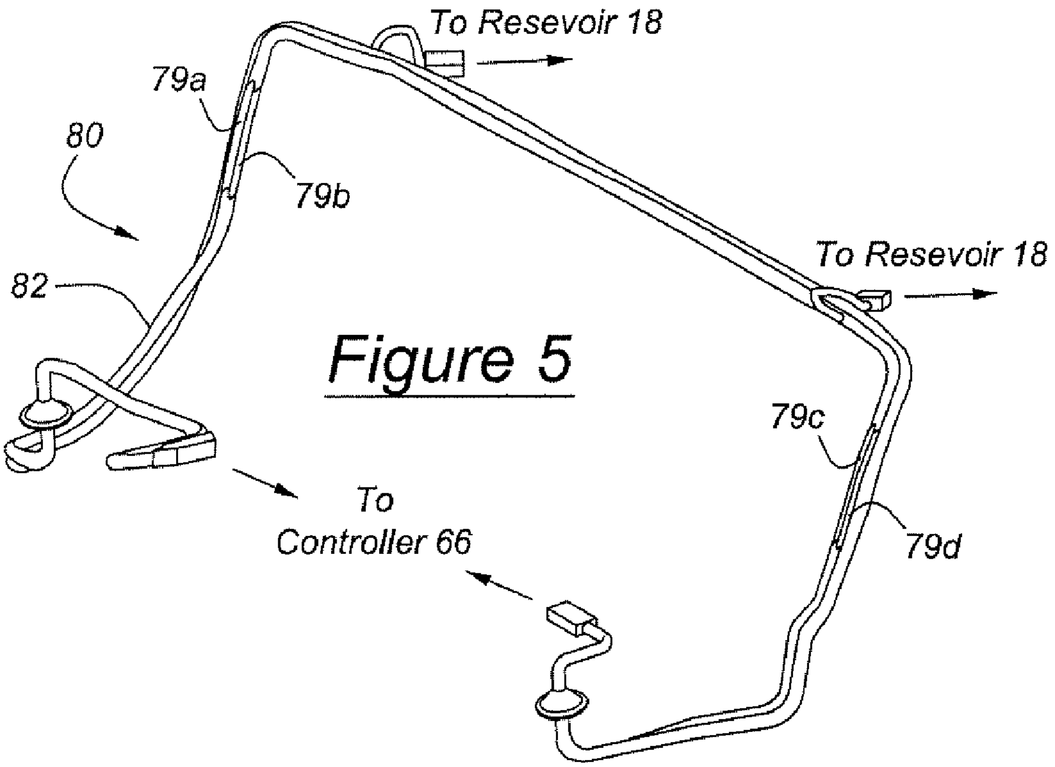
FIG. 5 illustrates a portion of a wiring harness used with the present system.

Because the present system is intended for use when the vehicle has received a severe impact, controller 66, which is shown in FIG. 3, contains a redundant power reserve or supply, which allows operation of the fire suppression system for about nine seconds, even if controller 66 becomes isolated from the vehicle's electrical power supply. Wiring harness 80, as shown in FIG. 5, is armored, and has a para-aramid fiber inner sheath, 82, of about 2 mm in thickness, which helps to shield the conductors within harness 80 from abrasion and cutting during a vehicle impact event. This para-aramid fiber is sold under the trade name KEVLAR® by the DuPont company. This armoring helps to assure that communication between controller 66 and reservoirs 18 remains in effect during an impact event. Post-impact communications are further aided by redundancy in the control system. Specifically, four independent sets of primary conductors, 79*a-d,* extend from controller 66 to reservoirs 18 protected by sheath 82. Moreover, an H-conductor, shown at 81 in FIG. 5, extends between reservoirs 18. Thus, if one or both of the primary conductors 79*a-b,* or 79*c-d,* extending to one of reservoirs 18 should become severed, H-conductor 81 will be available to carry the initiation signal from the undamaged lines to both of reservoirs 18.

Figure 9:
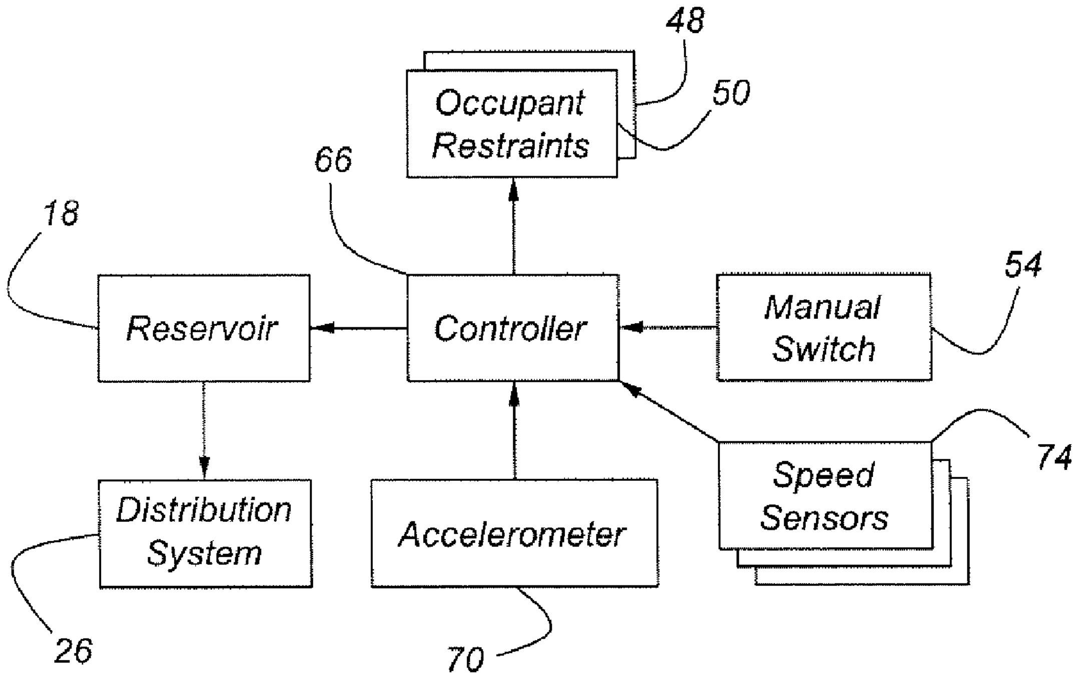
FIG. 9 is a block diagram of a fire suppression system and with additional components for occupant restraint according to one aspect of the present invention.

As noted above, an important feature of the present invention resides in the fact that the control parameters include not only vehicle impact, as measured by an accelerometer such as that shown at 70 in FIG. 9, but also vehicle speed, as measured by means of speed sensors 74, also shown in FIG. 9. Speed sensors 74 may advantageously be existing sensors used with an anti-lock braking system or vehicle stability system. Alternatively, speed sensors 74 could comprise a global positioning sensor or a radar or optically based ground-sensing system. Accelerometer 70, as noted above, could be used with a conventional occupant restraint airbag system, thereby maximizing use of existing systems within the vehicle. Advantageously, accelerometer 70 may be an amalgam of two or more accelerometers having differing sensing ranges. Such arrangements are known to those skilled in the art and suggested by this disclosure. At least a portion of the various sensors could either be integrated in controller 66 or distributed about vehicle 10.

Figure 6:
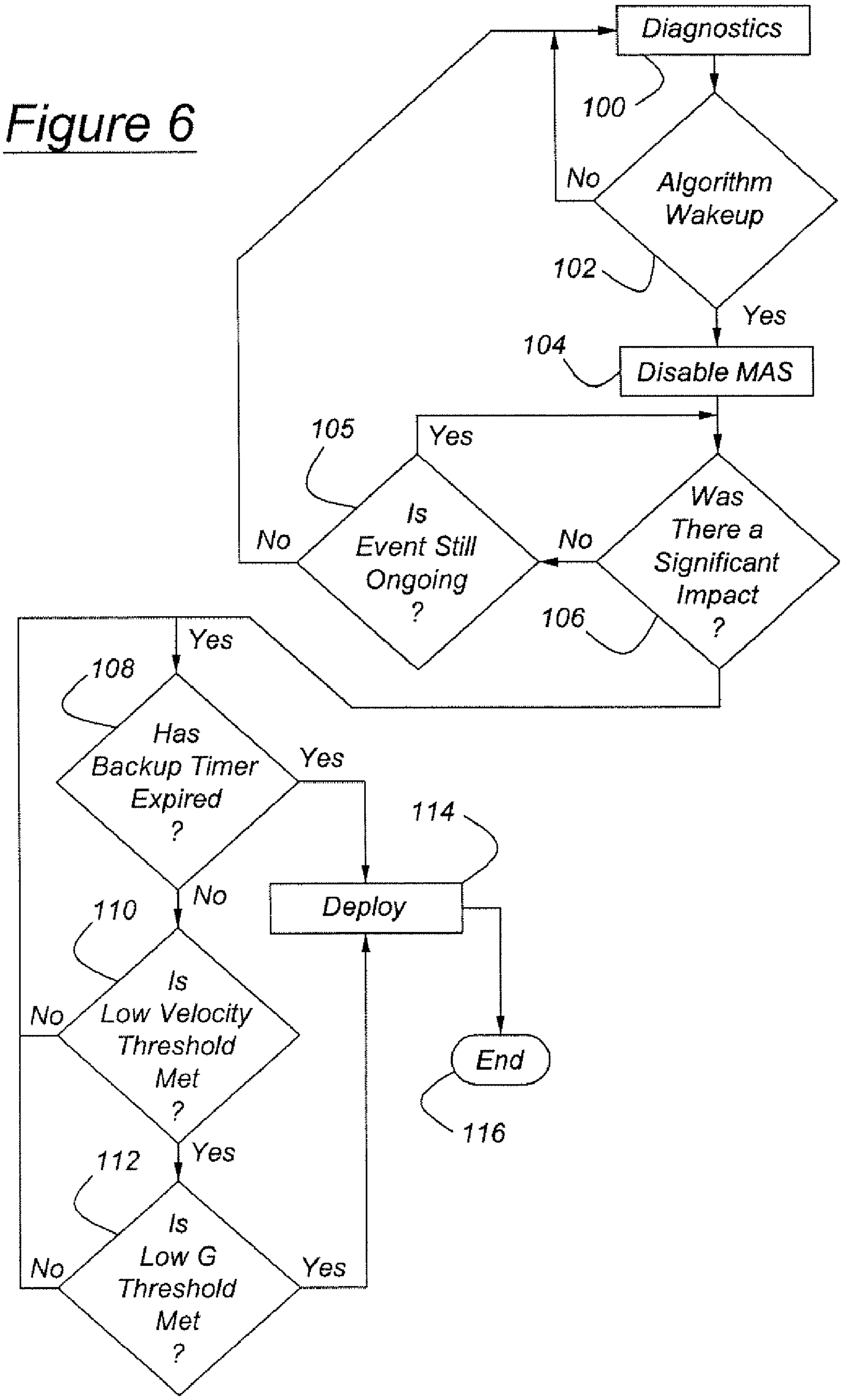
FIG. 6 is a flowchart showing a portion of the logic used to control a system according to the present invention.

FIG. 6 shows a sequence which is used according to one aspect of the present invention for activating a release of fire suppressant agent.

Beginning at block 100, controller 66 performs various diagnostics on the present system, which are similar to the diagnostics currently employed with supplemental restraint systems. For example, various sensor values and system resistances will be evaluated on a continuous basis. Controller 66 periodically moves to block 102, wherein the control algorithm will be shifted from a standby mode to an awake mode in the event that a vehicle acceleration, or, in other words, an impact, having a magnitude in excess of a relatively low threshold is sensed by accelerometer 70. Also, at block 102 a backup timer will be started. If the algorithm is awakened at block 102, controller 66 disables manually activatable switch 54 at block 104 for a predetermined amount of time, say 150 milliseconds. This serves to prevent switch 54 from inadvertently causing an out-of-sequence release of fire suppression agent. Note that at block 104, a decision has not yet been made to deploy fire suppression agent 22 as a result of a significant impact.

At block 106, controller 66 uses output from accelerometer 70 to determine whether there has been an impact upon vehicle 10 having a severity is in excess of a predetermined threshold impact value. Such an impact may be termed a significant, or "trigger", impact. If an impact is less severe than a trigger impact, the answer at block 106 is "no", and controller 66 will move to block 105, wherein an inquiry is made regarding the continuing nature of the impact event. If the event has ended, the routine moves to block 100 and continues with the diagnostics. If the event is proceeding, the answer at block 105 is "yes", and the routine loops to block 106.

If a significant impact is sensed by the sensor system including accelerometer 70 and controller 66, the answer at block 106 will be "yes." If such is the case, controller 66 moves to block 108 wherein the status of a backup timer is checked. This timer was started at block 102.

Once the timer within controller 66 has counted up to a predetermined, calibratable time on the order of, for example, 5-6 seconds, controller 66 will cause propellant 92 to initiate delivery of fire suppressant agent 22, provided the agent was not released earlier. Propellant 92 is activated by firing an electrical squib so as to initiate combustion of a pyrotechnic charge. Alternatively, a squib may be used to pierce, or otherwise breach, a pressure vessel. Those skilled in the art will appreciate in view of this disclosure that several additional means are available for generating the gas required to expel fire suppressant agent 22 from tank 90. Such detail is beyond the scope of this invention. An important redundancy is supplied by having two squibs located within each of tanks 90. All four squibs are energized simultaneously.

The velocity of the vehicle 10 is measured at block 110 using speed sensors 74, and compared with a low velocity threshold. In essence, controller 66 processes the signals from the various wheel speed sensors 74 by entering the greatest absolute value of the several wheel speeds into a register. This register contains both a weighted count of the number of samples below a threshold and a count of the number of samples above the threshold. When the register value crosses a threshold value, the answer at block 110 becomes "yes". In general, the present inventors have determined that it is desirable to deploy fire suppression agent 22 prior to the vehicle coming to a stop. For example, fire suppression agent 22 could be dispersed when the vehicle slows below about 15 kph.

At block 112, controller 66 enters a measured vehicle acceleration value into a second register. Thereafter, once the acceleration register value decays below a predetermined low g threshold, the answer becomes "yes" at block 112, and the routine moves to block 114 and releases fire suppressant agent 22. In essence, a sensor fusion method combines all available sensor information to verify that the vehicle is approaching a halt. The routine ends at block 116. Because the present fire suppression system uses all of the available fire suppression agent 22 in a single deployment, the system cannot be redeployed without replacing at least reservoirs 18.

FIG. 6 does not include the activation of occupant restraints 48 and 50, it being understood that known control sequences, having much different timing constraints, may be employed for this purpose. In point of contrast, the low velocity threshold allows the present system to deliver the fire suppression agent while the vehicle is still moving, albeit at a very low velocity. This prevents the rear wheels of the vehicle from shadowing, or blocking dispersion of fire suppressant agent 22. Also, in many cases, a vehicular fire may not become well-established until the vehicle comes to a halt.

Figure 10:
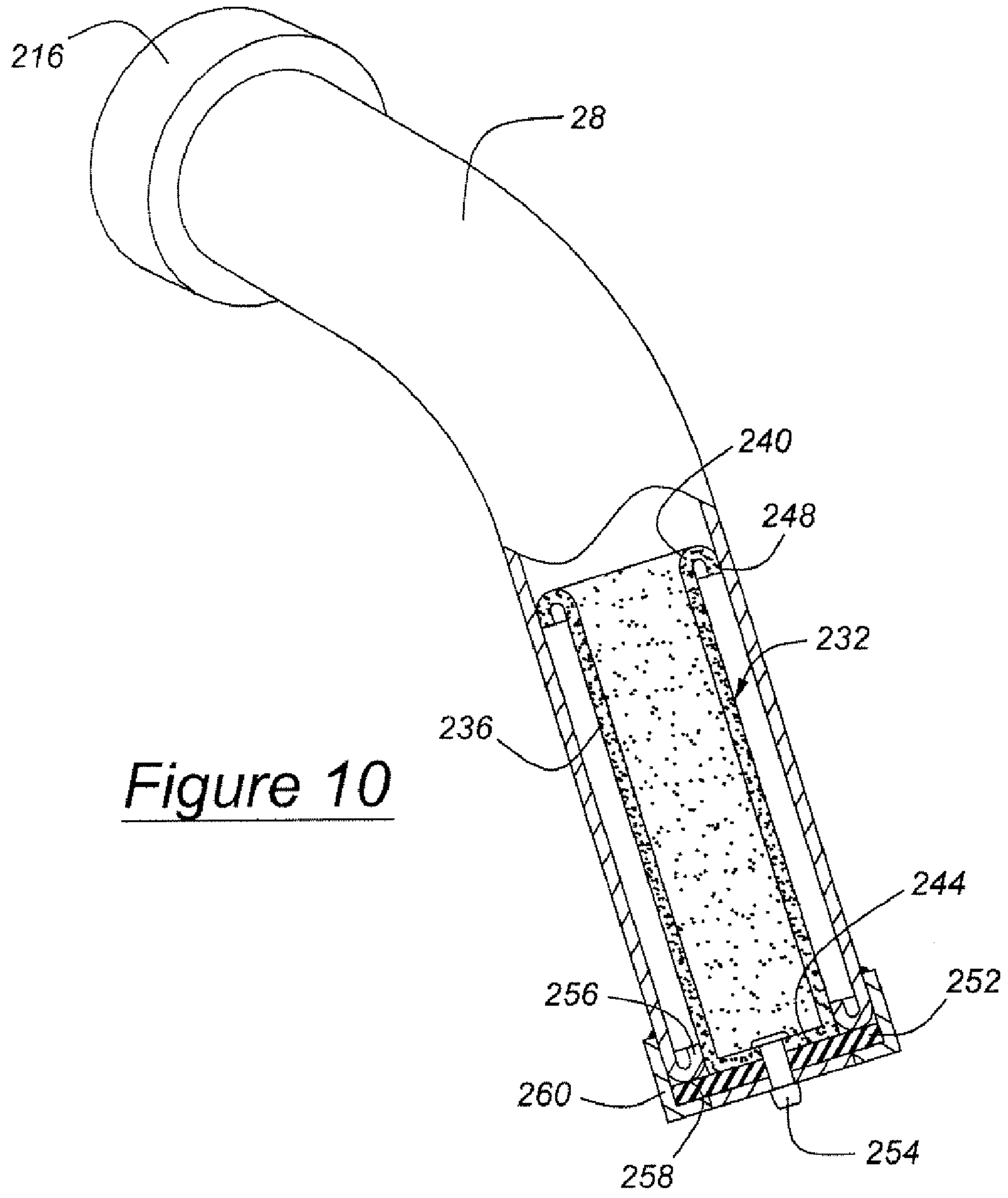
FIG. 10 depicts a portion of a distribution system having a porous nozzle, shown in a closed position.
Figure 11:
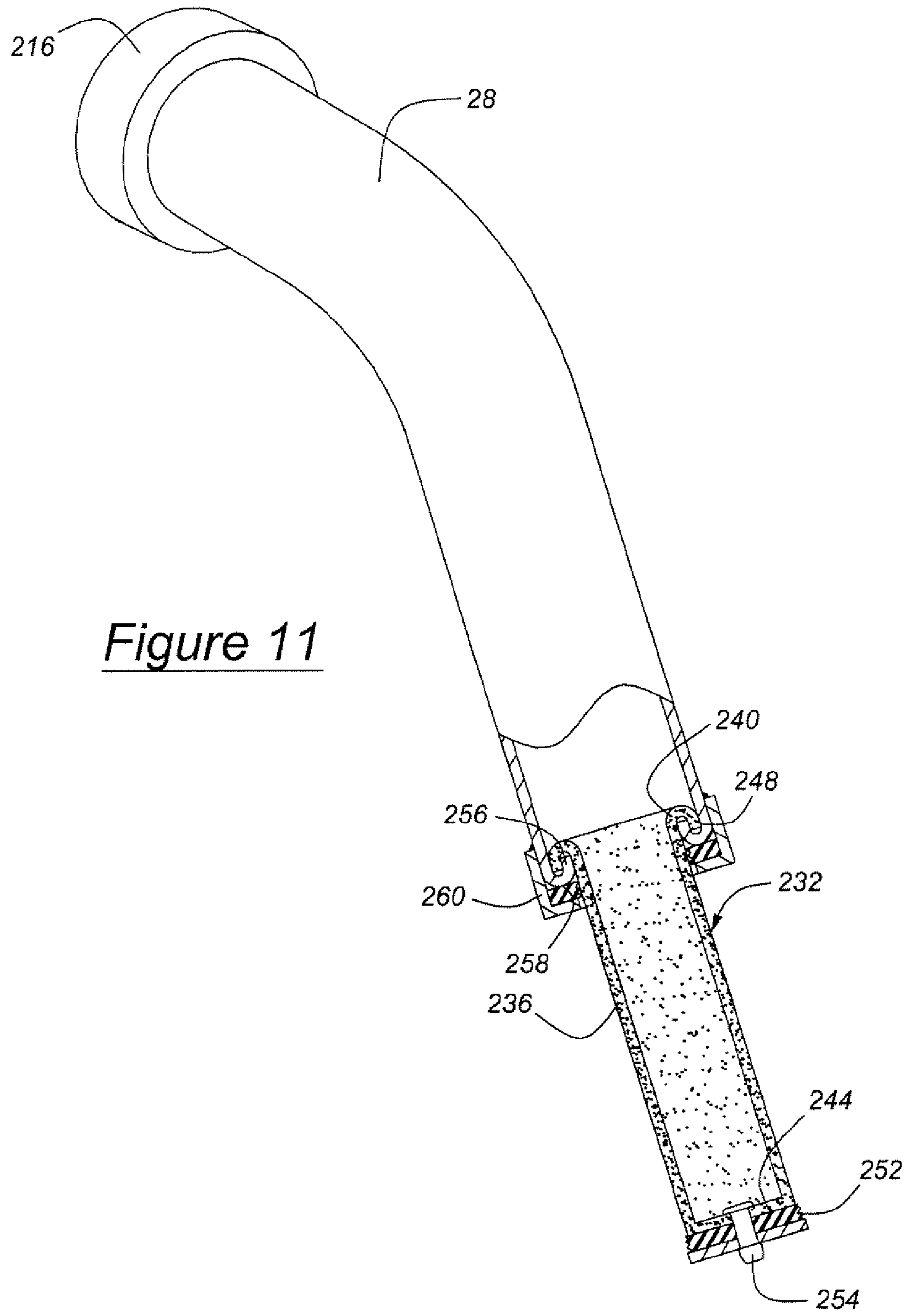
FIG. 11 depicts the nozzle of FIG. 10 in an open position.

FIGS. 10 and 11 illustrate an additional nozzle embodiment according to another aspect of the present invention. Rather than having a stamped and welded construction, nozzle 232 is porous. The porous material may be either ceramic, or sintered metal, or other types of porous materials known to those skilled in the art and suggested by this disclosure. The material may be cast, or pressed, or extruded, or formed by any other suitable method.

FIG. 10 shows nozzle body 236 in its stowed position, and FIG. 11 shows nozzle body 236 in its telescopically deployed position, which results from the buildup of fluid pressure within feeder conduit 28. While in the stowed position of FIG. 10, nozzle body 236 is retained within feeder conduit 28 by frangible sealing disc 252, which functions as a stowage seal by sealing against annular surface 258 formed in the end of feeder conduit 28. Frangible sealing disc 252 is maintained in contact with annular surface 258 by means of external seal retainer 260, which is attached to the outer end of feeder conduit 28.

Frangible sealing disc 252 serves not only to prevent the ingress of contamination into feeder conduit 28 when nozzle body 236 is in its stowed position, but also prevents the escape of fire suppression agent from the closed, or bulkhead end, 244 of nozzle body 236. This feature may be used to tune or adjust the distribution of fire suppression agent from nozzle 232.

When nozzle body 236 is projecting telescopically from feeder conduit 28, integral stop abutment and fluid seal 248 cooperates with internal stop abutment 256 formed at the end of conduit 28 to both seal the joint between nozzle body 236 and feeder conduit 28, and to prevent nozzle body 236 from separating from feeder conduit 28 in response to the fluid pressure of the flowing fire suppressant agent.

Figure 12:
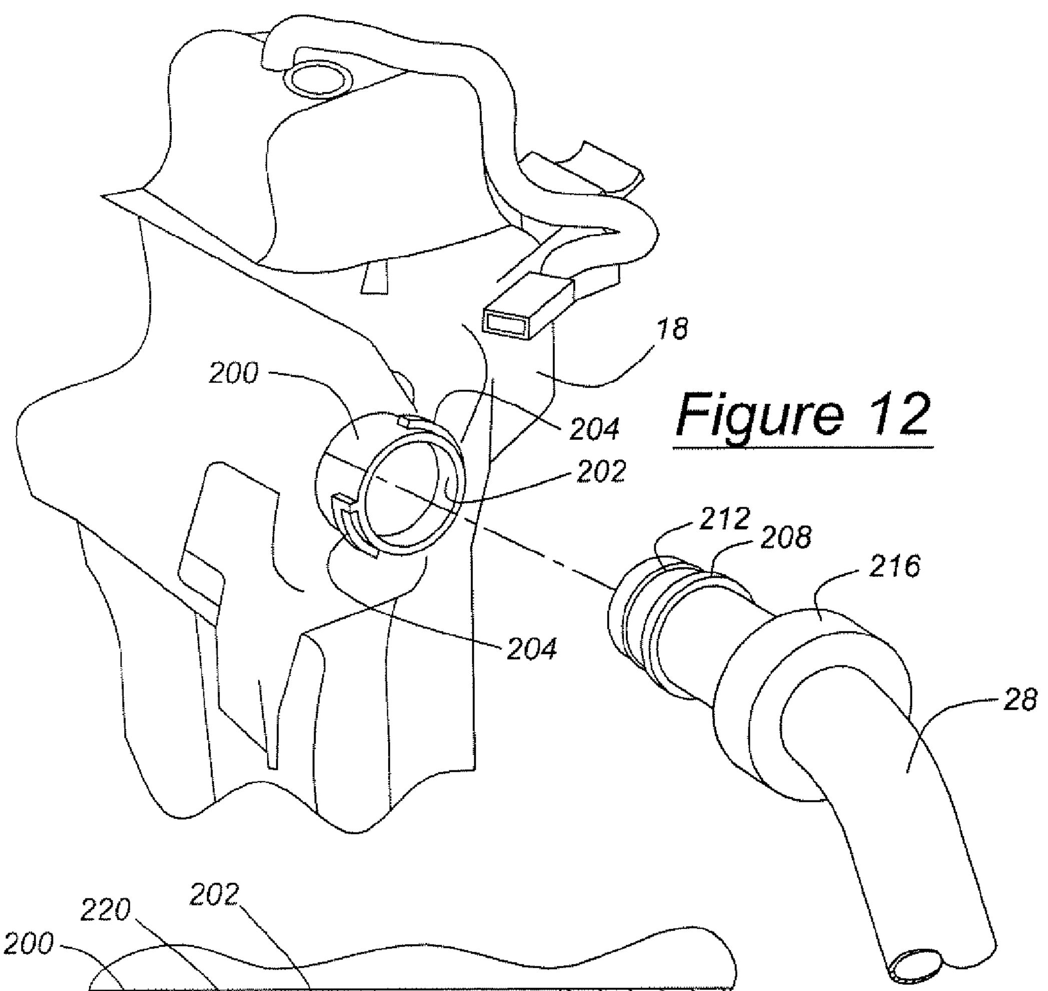
FIG. 12 illustrates a fire suppressant reservoir and distribution feeder conduit having a quick connect coupler for attaching the feeder conduit to the reservoir.
Figure 13:
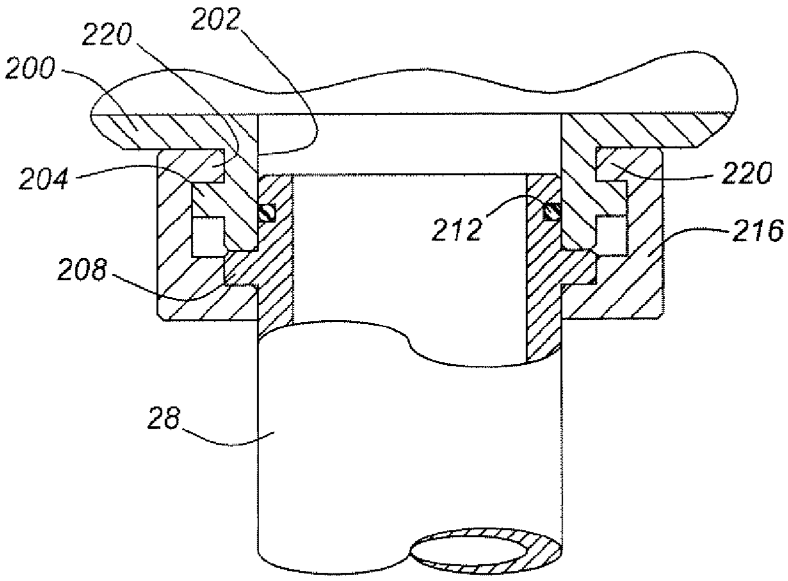
FIG. 13 is a sectional view of the quick connect coupler shown in FIG. 12.
Figure 14:
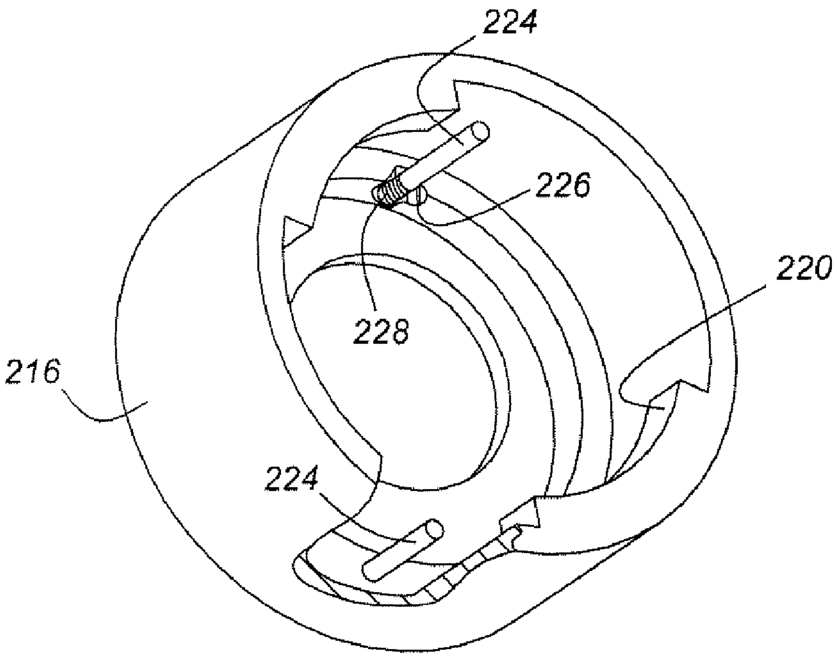
FIG. 14 is a perspective view of a locking collar incorporated within the coupler of FIGS. 12 and 13.

FIGS. 12, 13, and 14 illustrate another aspect of the present invention. A quick connect coupler attaches the fire suppressant feeder conduit to the suppressant reservoir. This facilitates assembly of the present fire suppression system in the underbody environment of a vehicle, thereby reducing assembly cost, while helping to assure integrity of the fire suppression system. Reservoir 18 is equipped with a spud, 200, having external threads, 204. Threads 204 are interrupted. The importance of this feature will be explained below. Feeder conduit 28 has an annular retention flange, 208, which abuts collar 216 when feeder conduit 28 is attached to reservoir 18.

A section of a fully assembled joint consisting of feeder conduit 28, spud 200, collar 216, and o-ring seal 212 is shown fully assembled in FIG. 13. Threads 220, which are formed internally on collar 216, cooperate with threads 204 formed on spud 200 to lock the various components together. O-ring seal is compressed between bore 202 of spud 200 and an outer surface of conduit 28, so as to provide a leak-tight seal between spud 200 and conduit 28. The joint of FIG. 13 is made up by inserting conduit 28 into spud bore 202 until retention flange 208 abuts spud 200. Then, retention collar 216 is brought into contact with spud 200 and collar 216 is rotated to lock threads 204 and 220. Because each of threads 204 and 220 are interrupted—i.e., they do not circumscribe the bases to which they are attached, collar 216 may be fully driven and seated upon spud 200 with less than one full revolution. This facilitates assembly of the present system under a vehicle body.

FIG. 14 illustrates an anti-rotation device including axially displaceable pins 224. When collar 216 has been fully rotated upon spud 200, pins 224 will be extended by compression springs (one spring, 228 being shown). Once pins 224 have extended, rotation of collar 216 in a direction permitting detachment of collar 216 from spud 200 will be prevented because each of pins 224 will abut one of threads 204 formed on spud 200. FIG. 14 also shows that retention collar 216 circumscribes conduit 28, so as to robustly join conduit 28 with spud 200.

Figure 15A:
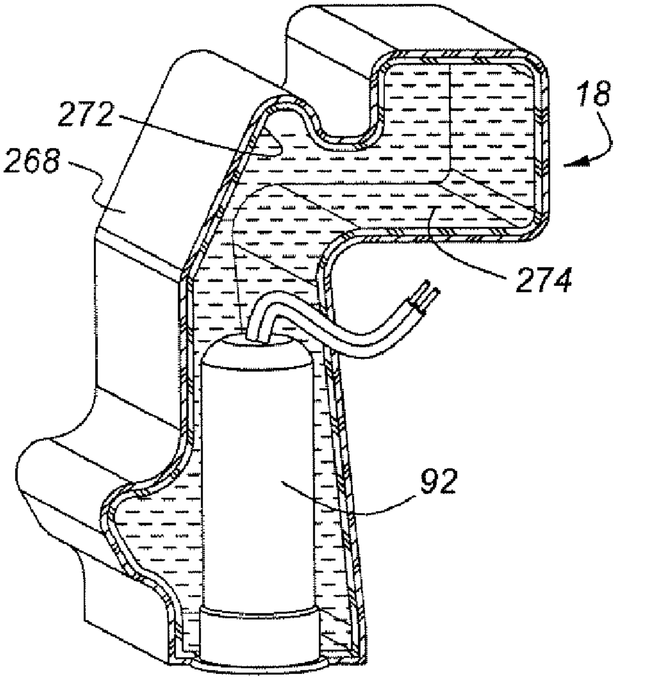
FIG. 15*a* illustrates a composite fire suppression agent reservoir according to one aspect of the present invention.
Figure 15B:
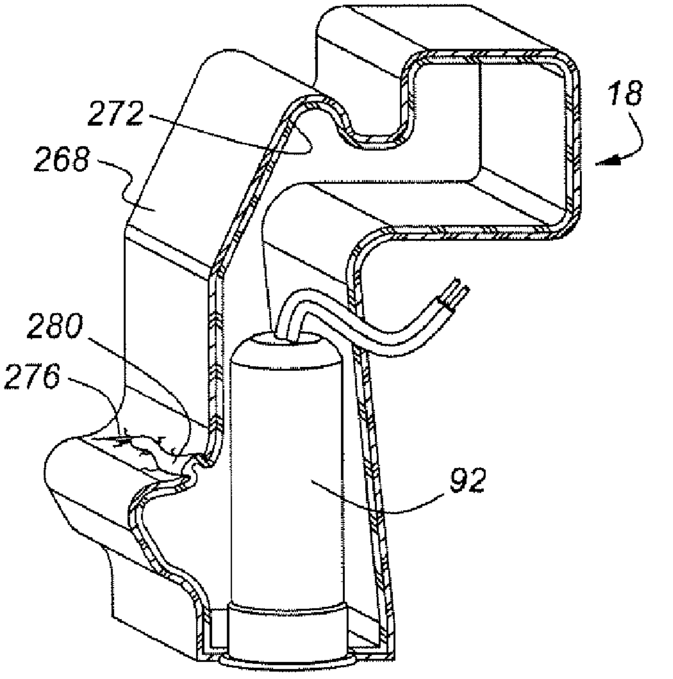
FIG. 15*b* illustrates the reservoir of FIG. 15*a* after a self-healing liner has stopped a pressure-induced fracture in the wall of the reservoir.

FIGS. 15*a* and 15*b* illustrate a fire suppressant reservoir, 264, formed as a composite characterized by a pressure vessel having an outer wall, 268, combined with a sealing liner, 272. Outer wall 268 may be formed from metal or fiber reinforced resin, or other metallic or nonmetallic materials or composites known to those skilled in the art and suggested by this disclosure.

Liner 272 is said to be a dynamic reservoir seal because liner 272 is sufficiently extrudable in response to fluid pressure produced by the propellant device that liner 272 will extrude or squeeze directly into discontinuities caused by the high operating pressure of the present fire suppression system. This extrusion will seal outer wall 268, preventing an excessive loss of the fire suppressant agent. In FIG. 15*b*, portion 280 of liner 272 is shown as having extruded through discontinuity 276. As shown in FIG. 15*b*, portion 280 is in sealing engagement with outer wall 268.

Sealing liner 272 may be formed from plastics or metals, elastomers, composites, or yet other materials known to those skilled in the art and suggested by this disclosure. In any event liner 272 is selected to provide the pressure-driven extrusion characteristic needed to seal outer wall 268 if a high pressure leak develops in reservoir 18.

Figure 16:
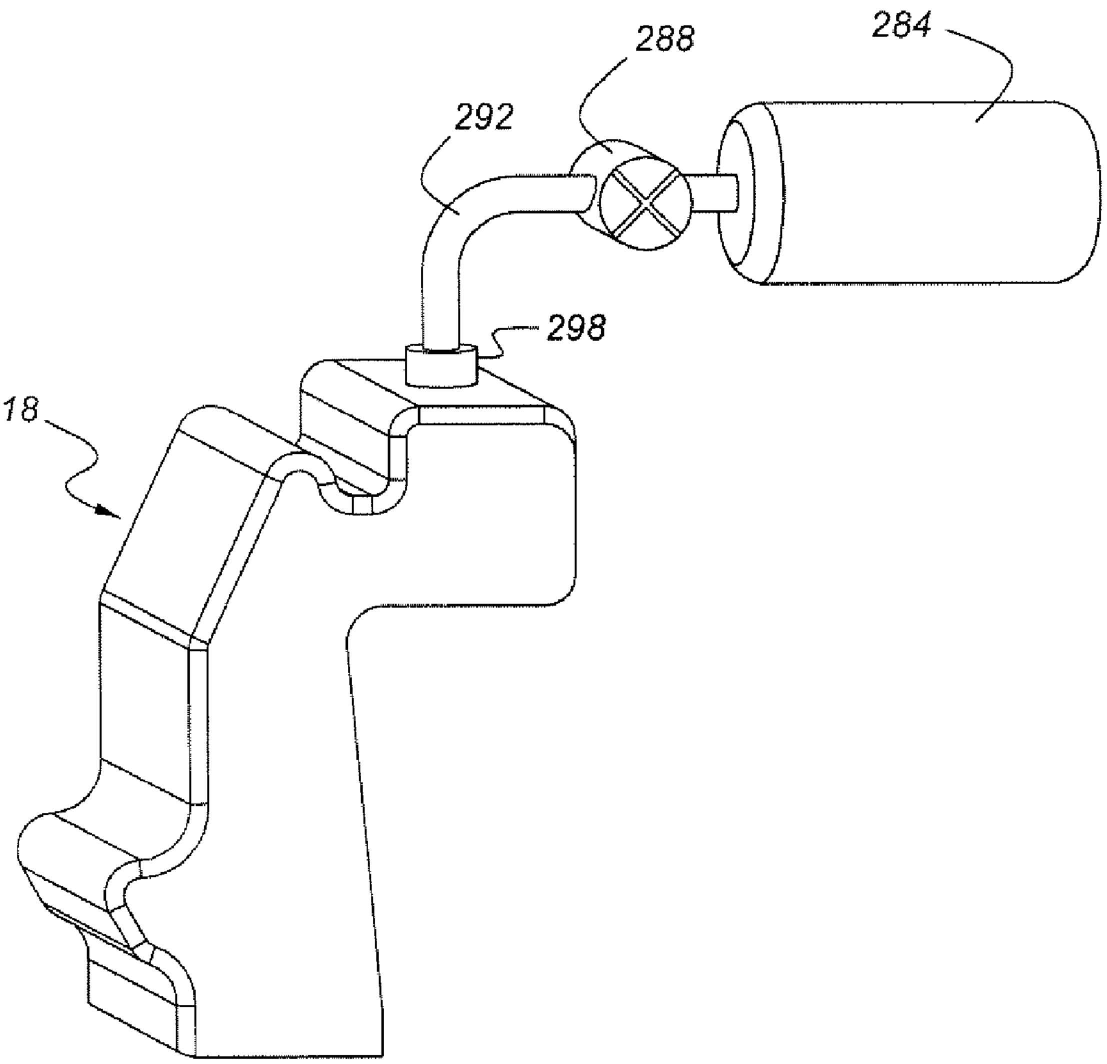
FIG. 16 illustrates a propellant having an external gas cylinder according to one aspect of the present invention.

FIG. 16 shows a second type of propellant useful for practicing the present invention. Compressed gas cylinder 284 is pre-charged with a high pressure gas, such as nitrogen. Valve 288, which is operatively connected with controller 66, is opened when needed to permit gas to flow from cylinder 284 and through high pressure conduit 292, thereby initiating discharge of the fire suppressant agent from reservoir 18. As but one alternative to the arrangement shown in FIG. 16, gas cylinder 284 could be located within reservoir 18 in the manner shown in FIGS. 15*a* and 15*b*, albeit at the expense of volume for the fire suppressant agent. The present compressed gas propellant provides a supply-chain advantage, inasmuch as non-pyrotechnic propellants are subject to less stringent shipping restrictions than are pyrotechnic devices.

Figure 17:
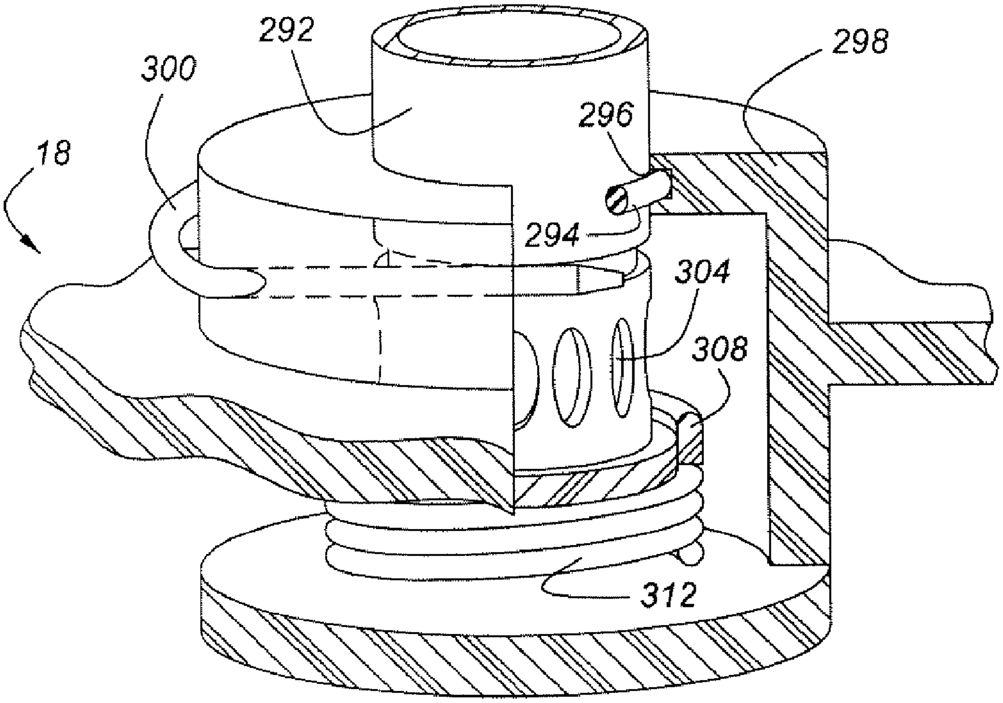
FIG. 17 illustrates a connector for attaching the gas cylinder of FIG. 16 to a suppression agent reservoir.

FIG. 17 illustrates a system for connecting high pressure conduit 292 with reservoir 18. A dome, 298 is provided in an upper surface of reservoir 18. Dome 298 has a port, 296, through which conduit 292 extends into the interior of reservoir 18. As conduit 292 is inserted, it displaces valve disc 308 and spring 312. Conduit 292 is retained within port 296 by means of retainer 300, which passes through holes (not shown) formed dome 298. Once conduit 292 has been installed, high pressure gas may flow into reservoir 18 through a series of exit orifices 304 formed in conduit 292.

According to another aspect of the present invention, a fire suppressant agent used with this system may be either a single component, generally an aqueous-based preparation, or a binary system in which a primary component is carried within a first, or primary, reservoir, and a secondary component, such as potassium carbonate, is carried within a secondary reservoir accessible to the fire suppression system's feeder conduits. Passage of the primary component through a feeder conduit will cause the secondary component to be released such that the primary component and the secondary component will be combined before being discharged from the distribution nozzles. In essence, the purpose of the secondary component delivery system is to place the secondary component into a stream of primary component flowing within the present distribution system. If the secondary delivery system is housed within feeder conduit 28, the need for an additional discrete reservoir for the secondary component may be avoided.

Figure 18A:
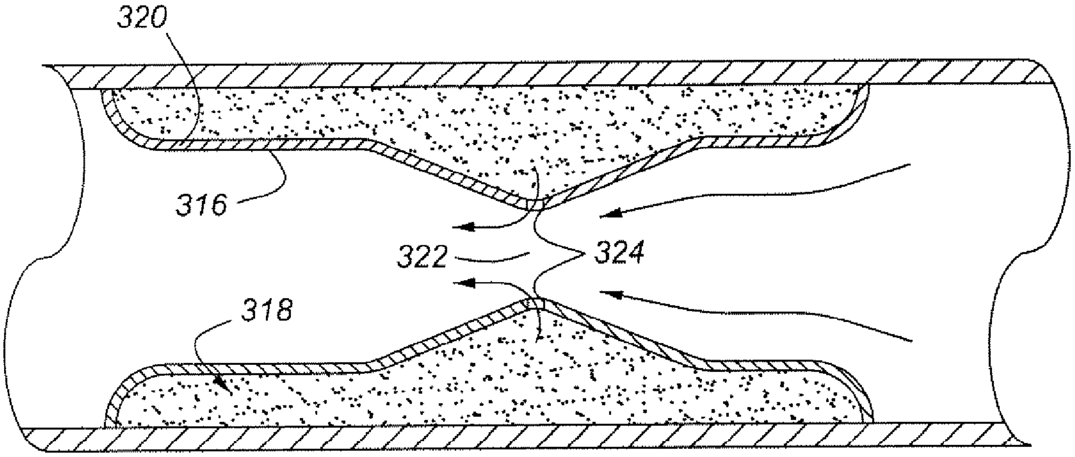
FIGS. 18*a*, 18*b*, 18*c*, and 18*d* illustrate various structures for introducing a secondary component of a binary fire suppression agent according to one aspect of the present invention.

FIGS. 18*a*-18*d* illustrate several embodiments of secondary reservoirs. FIG. 18*a* shows a secondary reservoir defined by venturi tube 316, which establishes an annular-shaped storage chamber, 320 within feeder conduit 28. A number orifices, 324 are formed at the throat, 322, of venturi tube 316, such that primary component flowing through venturi tube 316 will cause secondary component 318 to be drawn through orifices 324 and aspirated into the flowing primary component stream. In the embodiment of FIG. 18*a*, secondary component 318 could be in either a liquid or a powder state.

Figure 18B:
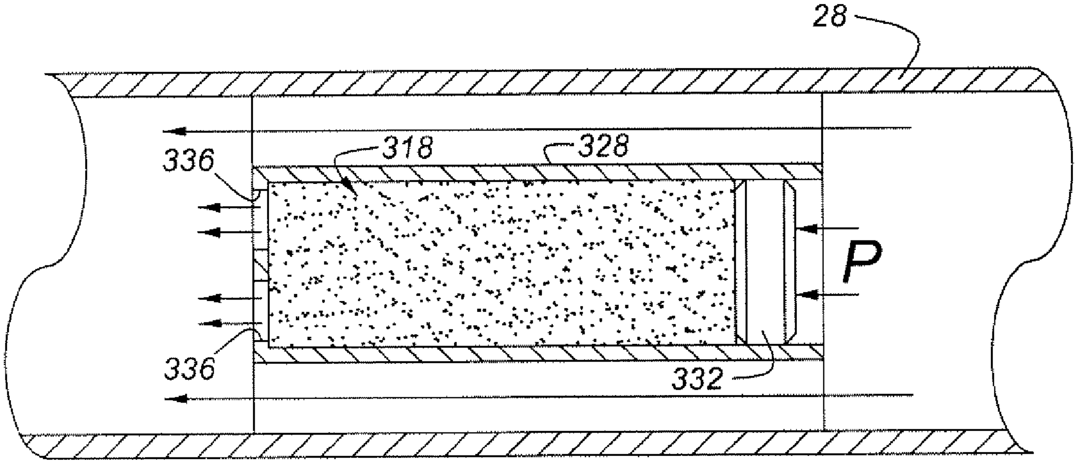

FIG. 18*b* illustrates a secondary reservoir having a generally cylindrical housing, 328, which is filled with secondary component 318 in either a powder or gelatinous state. As with the embodiment of FIG. 18*a*, housing 328 is located within feeder conduit 28. Pressure-responsive piston 332 is displaced by the pressure of the flowing primary component, and, as piston 332 moves down the bore of cylindrical housing 328, secondary component 318 will be expelled through discharge orifices 336.

Figure 18C:
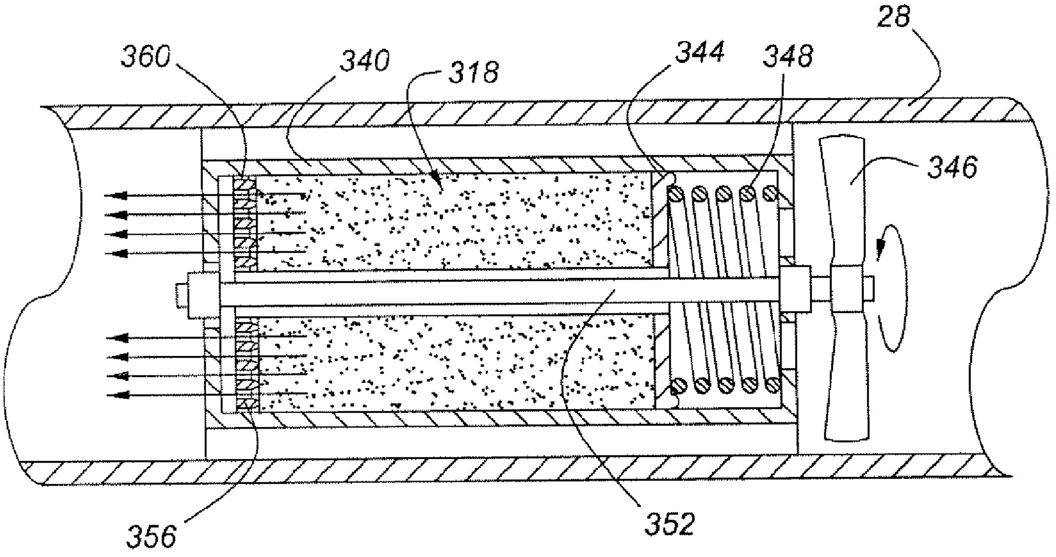

FIG. 18*c* illustrates a secondary reservoir having a generally cylindrical housing, 340, enclosing a quantity of secondary component 318, preferably in either a gelatinous or powdered state. When the primary component is flowing through feeder conduit 28, turbine 346, as well as shaft 352 and shredder blade 356, will rotate in the manner of a windmill. As a result, shredder blade 356 will cooperate with shredder plate 360 to pulverize secondary component 318, which is forced through shredder plate 360 by piston 344 and compression spring 348.

Figure 18D:
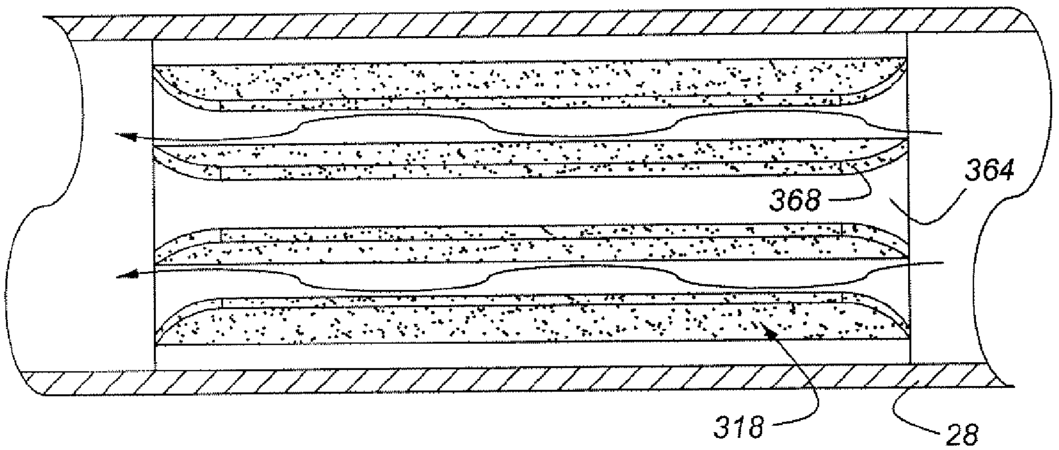

FIG. 18*d* illustrates a sacrificial secondary reservoir having a hollow cylindrical plug or lining, 364 made from solid secondary component, such as potassium carbonate. Lining 364 has a number of integral internal splines, 368. Lining 364 is formulated and processed so that flowing primary component will cause lining 364 to be eroded and entrained in the flowing primary component.

Figure 19:
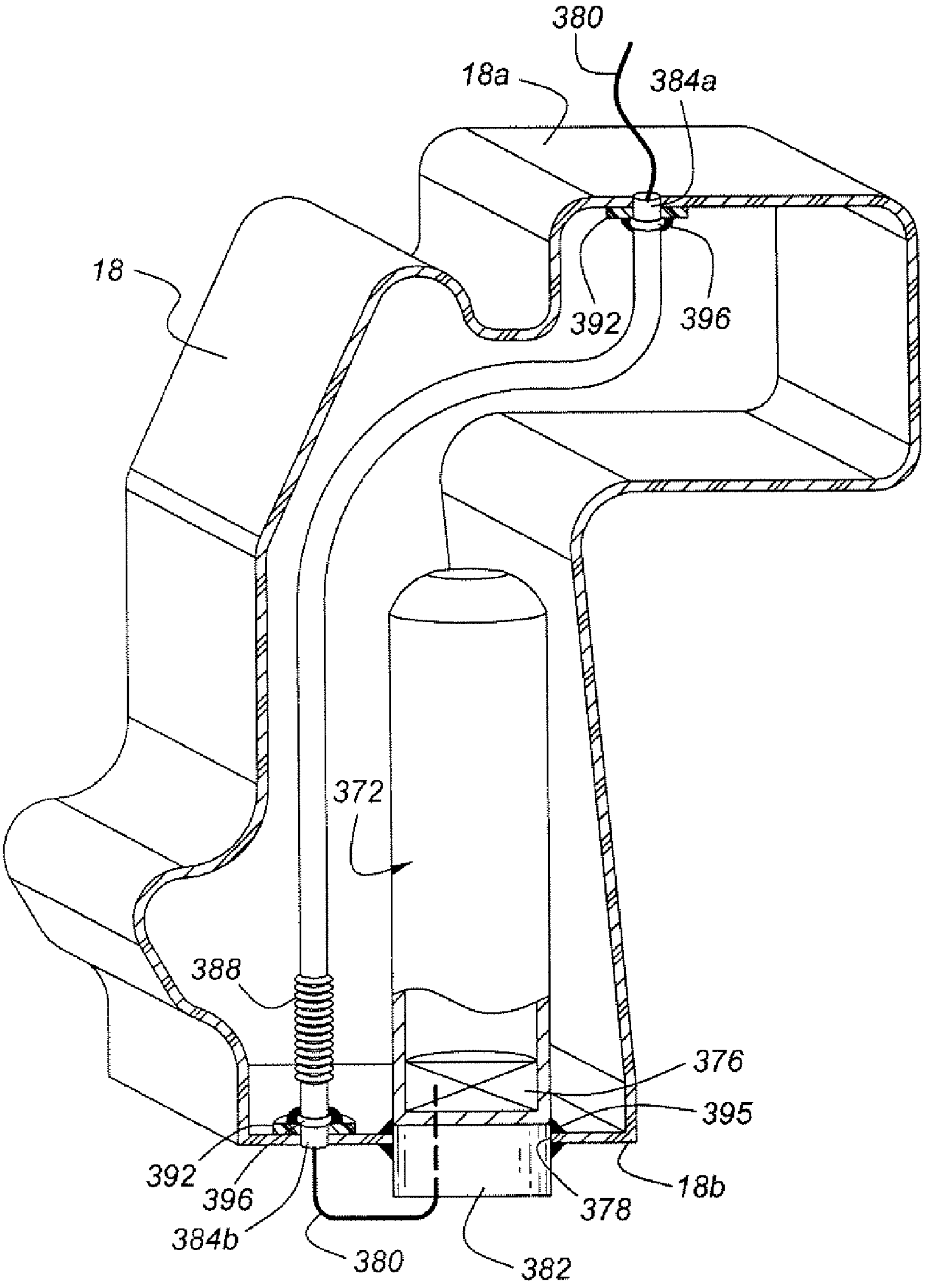
FIG. 19 illustrates an axially compliant initiator conductor conduit useful with a composite fire suppression agent reservoir according to one aspect of the present invention.

With a composite fire suppressant reservoir, it is generally not possible to weld the initiator conductor conduit extending from an upper portion of the reservoir to a lower portion of the reservoir, to the reservoir itself. However, with the axially compliant conduit illustrated in FIG. 19, this problem is avoided, while permitting the initiator conductor to be protected against damage. Conduit 384 is inserted into reservoir 18 after the pressure vessel shell, in this case, the outer wall of reservoir 18, has been fabricated. This process begins with insertion of conduit 384 into the interior of reservoir 18 through assembly port 378. Installation of conduit 384 continues with placement of the conduit's upper end, 384*a*, into an upper conduit port formed in wall 18*a*. Then, axial compliance section 388 is compressed sufficiently to allow lower end 384*b* of conduit 384 to be inserted to a lower conduit port located in lower wall 18*b*. Conduit 384 is then permitted to expand axially. Then, an initiator conductor or wire, 380 may be inserted into conduit 384. Finally, propellant device 372, which is attached to base 382, may be mounted within port 378.

Conduit 384 has an upset section, 396, adjacent to each of its upper and lower ends, 384*a* and 384*b*, and these upset sections 396 lock into bonding flanges 392, which are adhesively sealed to reservoir walls 18*a* and 18*b*.

Figure 20A:
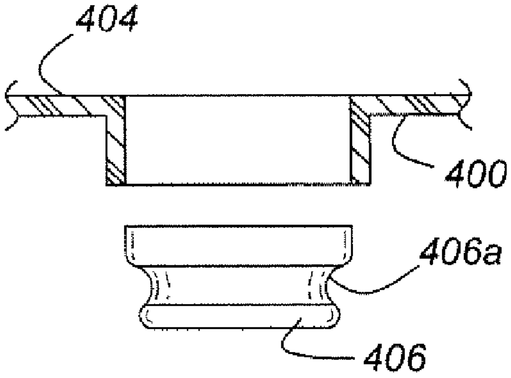
FIGS. 20*a*, 20*b*, and 20*c* illustrate steps for assembling a composite fire suppression agent reservoir having a closure plug made from a different material than the outer wall of the reservoir.
Figure 20B:
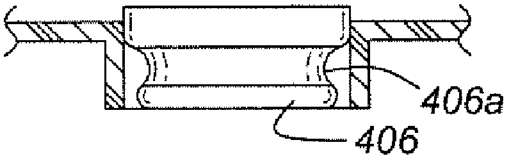
Figure 20C:
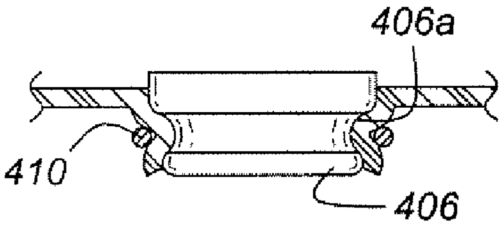

FIGS. 20*a*-20*c* illustrate a method for assembling a composite fire suppression agent reservoir having a closure plug either made from a different material than the outer wall of the reservoir, or from a material which is not thermally weldable to the outer wall. FIG. 20*a* shows a preform having outer wall 400, and inner reinforcement 404. Closure plug 406 has a circumferential groove, 406*a*, which allows tension band 410 purchase to bind outer wall 400 and inner reinforcement 404 to closure plug 406. Plug 406 may be solvent welded, or bonded with various adhesives known to those skilled in the art, to outer wall 400 and inner reinforcement 404.

Figure 21:
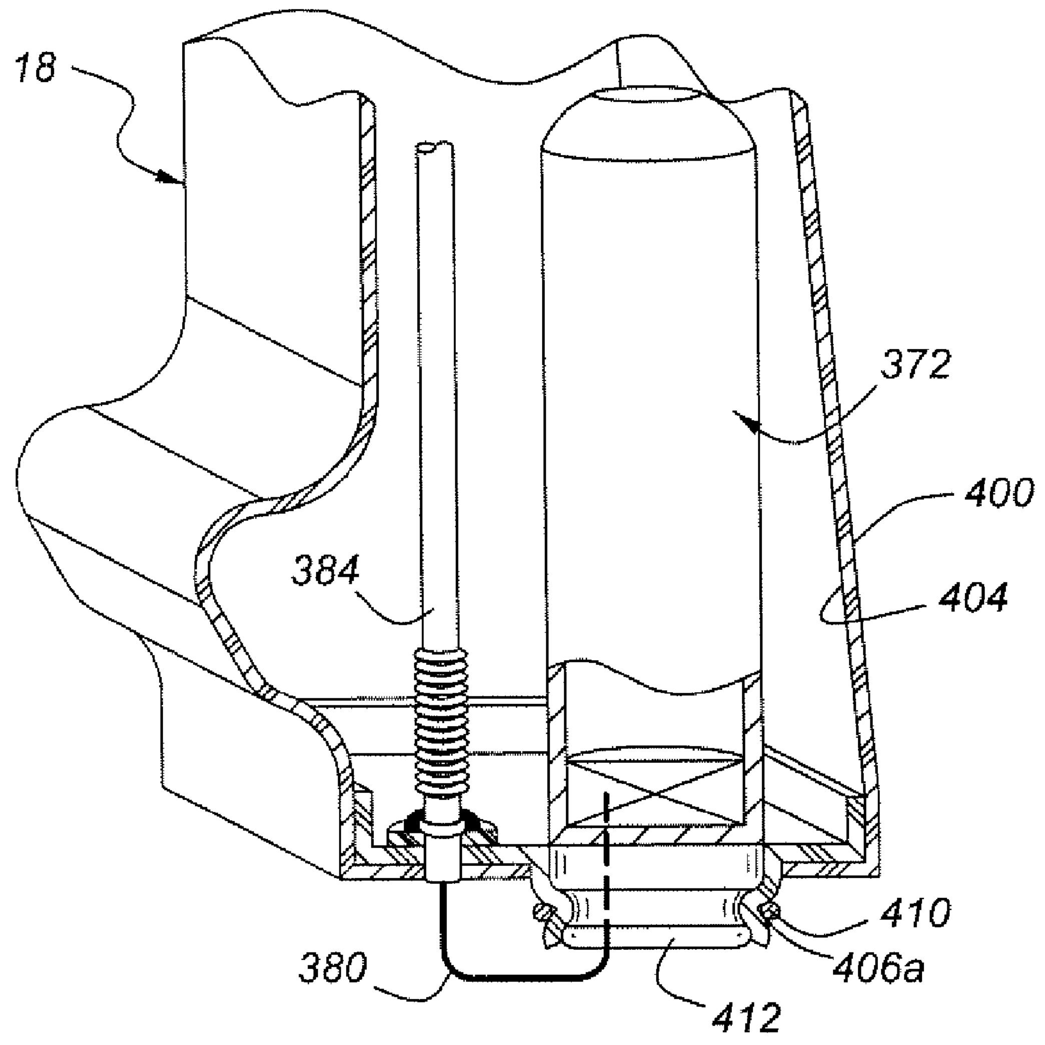
FIG. 21 illustrates an assembled composite fire suppression agent reservoir having a closure plug made from a different material than the outer wall of the reservoir.

The embodiment of FIGS. 20*a*-20*c* is especially useful for practicing a variant of the present invention in which an external propellant is employed. On the other hand, the embodiment of FIG. 21 shows a combined structure in which closure plug 412 is also employed as a base for internally located propellant 372. As before, plug 412 may be attached to the composite wall of reservoir 18 both mechanically by means of tension band 410 and/or by chemical bonding or friction welding.

Figure 22:
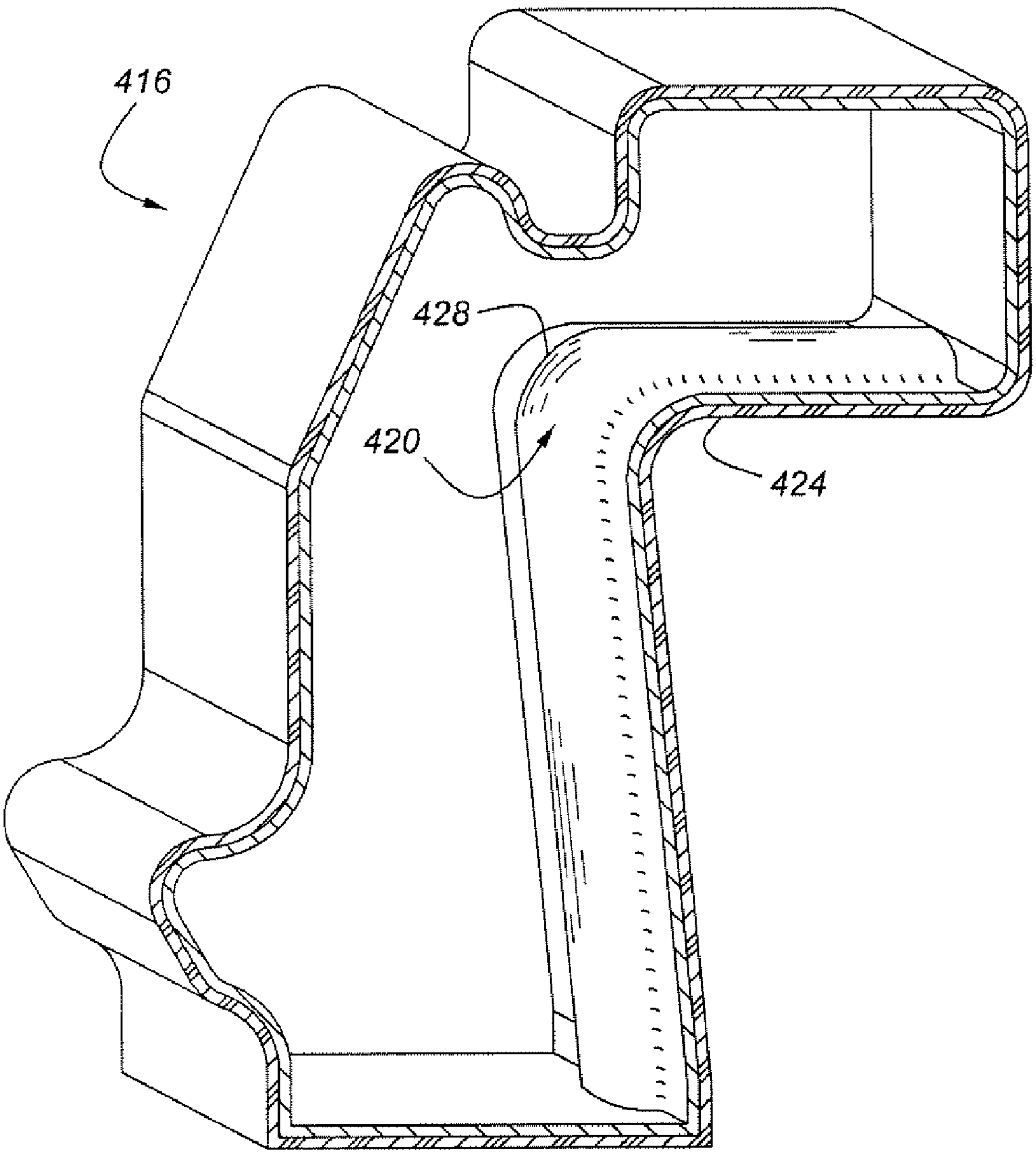
FIG. 22 illustrates a reinforced composite fire suppression agent reservoir having double concave section.
Figure 23:
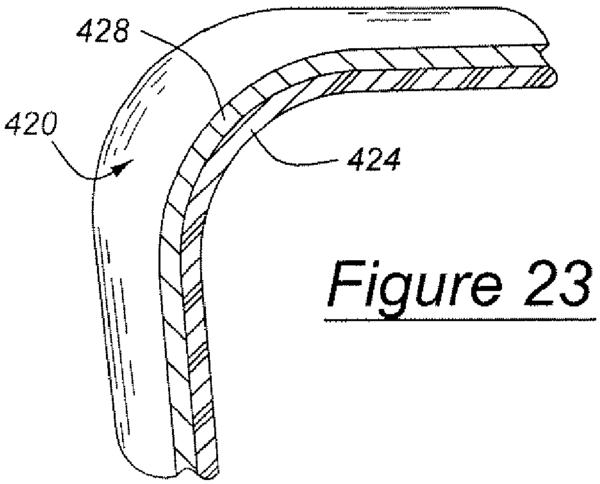
FIG. 23 is a sectional view of a double concave section of the reservoir depicted in FIG. 22.
Figure 24A:
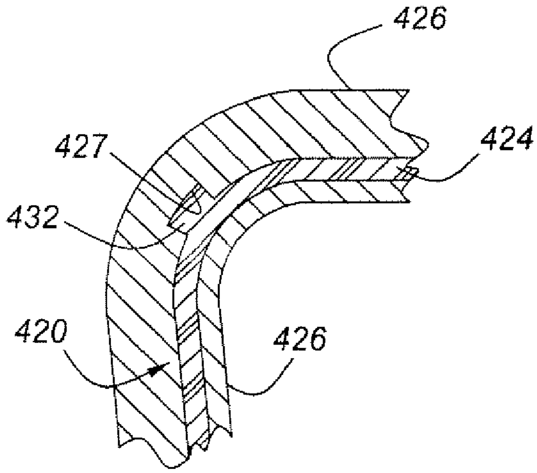
FIGS. 24*a* and 24*b* illustrate integral ribs formed externally and internally, respectively, as part of the composite reservoir of FIG. 22.
Figure 24B:
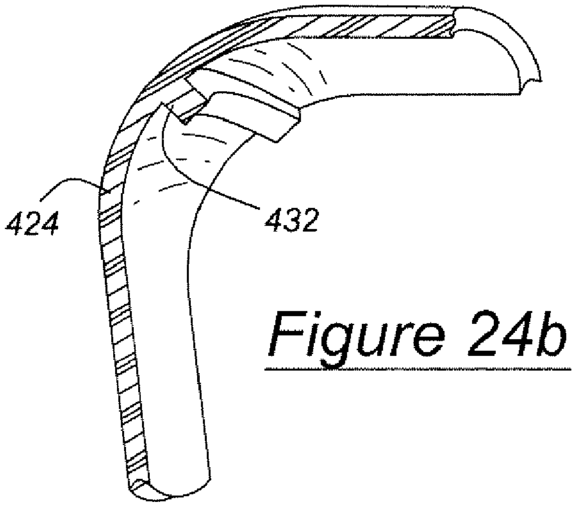

The reservoir shown in FIG. 22, which is ideally constructed of composite material, employs at least one double concave section to promote the adaptability of the reservoir for installation into spaces having irregular geometry. Accordingly, reservoir 416 is shown with double concave section 420, which is generally bowl-shaped. Section 420 is reinforced by metallic doubler 428, which may be insert molded to the interior surface of double concave section 420. FIG. 24*a* illustrates an embodiment in which mold 426 has a groove, 427, which forms an integral rib, 432, on an outer portion of double concave section 420 during the process of molding reservoir 416. FIG. 24*b* illustrates a similar embodiment in which rib 432 is formed on an inner surface of section 420. In the interest of clarity, mold 426 is not shown in FIG. 24*b*, or FIGS. 25*a* and 25*b*.

Figure 25A:
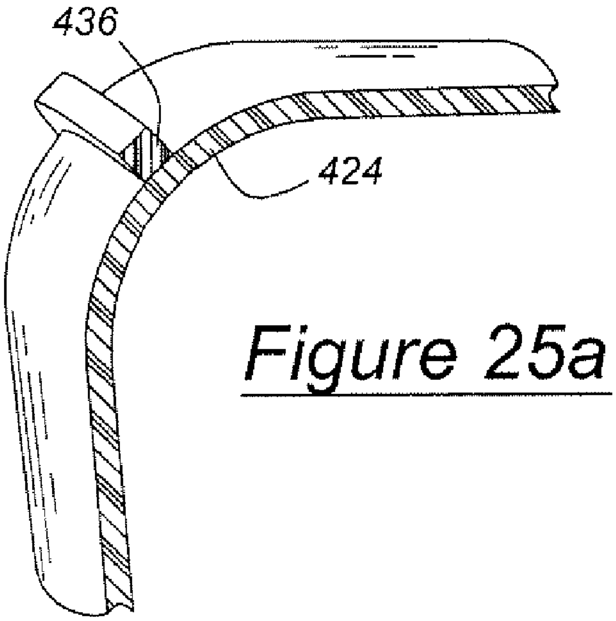
FIGS. 25*a* and 25*b* illustrate preformed ribs bonded externally and internally, respectively, to the outer wall of the composite reservoir of FIG. 22.
Figure 25B:
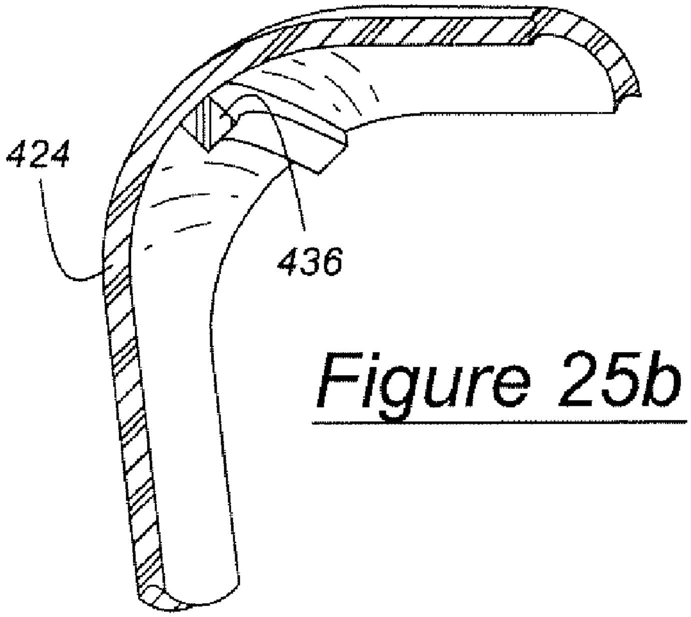

In the embodiments of FIGS. 25*a* and 25*b*, preformed ribs are insert molded to double convex section 420. More specifically, in FIG. 25*a*, rib 436 is shown as having been insert molded to an outer portion of section 420, and in FIG. 25*b*, rib 436 is shown as having been molded or bonded to an inner surface of section 420. Those skilled in the art will appreciate in view of this disclosure that insert molding may be accomplished by fabricating a preform, in this case ribs 436, which are placed into the mold 426 prior to injecting and curing the resin. Ribs 436 may be fabricated from either fiber-reinforced resin, or other metallic or non-metallic materials or composites known to those skilled in the art and suggested by this disclosure.

Although the present invention has been described in connection with particular embodiments thereof, it is to be understood that various modifications, alterations, and adaptations may be made by those skilled in the art without departing from the spirit and scope of the invention set forth in the following claims.

What is claimed:

1. An onboard fire suppression system for an automotive vehicle, comprising:

at least one reservoir containing a fire suppressant agent and a propellant, operatively associated with the reservoir, for expelling the fire suppressant agent from the reservoir, with said reservoir being structured for mounting to a vehicle; and a distribution system for receiving fire suppressant agent expelled from said reservoir and for distributing the suppressant agent in at least one location external to a vehicle, with said distribution system comprising:

at least one feeder conduit;

a plurality of nozzles connected with said feeder conduit; and a quick connect coupler for attaching said at least one feeder conduit to said reservoir, wherein said quick connect coupler comprises:

an externally threaded spud projecting from, and attached to, said reservoir;

an end portion of said feeder conduit having a retention flange and an outer diameter sized so as to permit telescopic insertion of said end portion into said threaded spud; and an internally threaded retainer collar for threadedly engaging said threaded spud, with said collar circumscribing said end portion of said at least one feeder conduit and having a shoulder for abutting said flange.

2. An onboard fire suppression system according to claim 1, wherein said plurality of nozzles comprises at least one pressure-responsive, variable geometry nozzle.

3. An onboard fire suppression system according to claim 1, wherein said plurality of nozzles comprises a plurality of pressure-responsive, variable geometry nozzles and a plurality of fixed geometry nozzles.

4. An onboard fire suppression system according to claim 1, wherein the threads of said externally threaded spud and said retainer collar are segmented such that said retainer collar may be locked to said spud with a twist encompassing less than one full turn of said retainer collar.

5. An onboard fire suppression system according to claim 4, wherein said quick connect coupler further comprises at least one anti-rotation device for preventing said retainer collar from rotating with respect to said spud, in a disengagement direction, by an amount sufficient to allow said retainer collar and said end portion of said feeder conduit to separate from said spud once said retainer collar has been locked with said spud.

6. An onboard fire suppression system according to claim 5, wherein said anti-rotation device comprises at least one spring-loaded pin carried within a bore formed in said retainer collar.

7. An onboard fire suppression system for an automotive vehicle, comprising:

at least one reservoir containing a fire suppressant agent, with said reservoir being structured for mounting to a vehicle;

a propellant, operatively associated with the reservoir, for expelling the fire suppressant agent from the reservoir, and a distribution system for receiving fire suppressant agent expelled from said reservoir and for distributing the suppressant agent in at least one location external to a vehicle, with said distribution system comprising:

at least one feeder conduit;

a plurality of nozzles connected with said feeder conduit; and a quick connect coupler for attaching said feeder conduit to said reservoir, with said quick connect coupler comprising;

an externally threaded spud projecting from, and attached to, said reservoir;

an end portion of said feeder conduit having a retention flange and an outer diameter sized so as to permit telescopic insertion of said end portion into said threaded spud; and an internally threaded retainer collar for threadedly engaging said threaded spud, with said collar circumscribing said end portion of said at least one feeder conduit and having a shoulder for abutting said retention flange, and with said retainer collar having an integral anti-rotation device.

* * * * *